United States Patent
Kim et al.

(10) Patent No.: US 9,720,636 B2
(45) Date of Patent: Aug. 1, 2017

(54) CLOUD PRINT SERVER AND METHOD OF PROVIDING AUTOMATIC CONNECTION SERVICE PERFORMED BY THE CLOUD PRINT SERVER

(71) Applicant: SAMSUNG ELECTRONICS CO., LTD., Suwon-si (KR)

(72) Inventors: Min-hyun Kim, Suwon-si (KR); Dae-hyun Kim, Yongin-si (KR); Jin-sil Kim, Suwon-si (KR); Dae-yeon Jang, Suwon-si (KR); Hang-min Cho, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/012,955

(22) Filed: Feb. 2, 2016

(65) Prior Publication Data

US 2016/0224279 A1 Aug. 4, 2016

(30) Foreign Application Priority Data

Feb. 4, 2015 (KR) .......................... 10-2015-0017469

(51) Int. Cl.
*G06F 15/16* (2006.01)
*G06F 3/12* (2006.01)
*H04L 29/08* (2006.01)

(52) U.S. Cl.
CPC .......... *G06F 3/1288* (2013.01); *G06F 3/1207* (2013.01); *G06F 3/1229* (2013.01); *G06F 3/1259* (2013.01); *G06F 3/1292* (2013.01); *H04L 67/10* (2013.01); *H04L 67/28* (2013.01); *H04L 67/32* (2013.01)

(58) Field of Classification Search
CPC ...... G06F 3/1288; G06F 3/1259; G06F 3/126; G06F 3/1292; G06F 3/1289
See application file for complete search history.

(56) References Cited

U.S. PATENT DOCUMENTS

| 2001/0055125 | A1 | 12/2001 | Yamada et al. |
| 2005/0128514 | A1* | 6/2005 | Wanda ..................... G06F 3/121 358/1.15 |
| 2011/0007347 | A1 | 1/2011 | Kamath et al. |
| 2011/0194140 | A1 | 8/2011 | Sweet et al. |

(Continued)

FOREIGN PATENT DOCUMENTS

KR  10-1350755  1/2014

OTHER PUBLICATIONS

Korean Office Action dated Jun. 16, 2016 in corresponding Korean Patent Application No. 10-2015-0017469 (5 pages) (3 pages English Translation).

(Continued)

*Primary Examiner* — Hitesh Patel
(74) *Attorney, Agent, or Firm* — Staas & Halsey LLP

(57) ABSTRACT

A method of providing an automatic connection service by a server includes: acquiring at least one of state information of an image forming apparatus and state information of a job performed by the image forming apparatus; determining whether the acquired at least one of state information satisfies a performing condition stored in a second server; and if the stored performing condition is satisfied, performing a stored operation in accordance with the stored performing condition.

18 Claims, 32 Drawing Sheets

(56) References Cited

U.S. PATENT DOCUMENTS

2012/0206765 A1* 8/2012 Nakajo ................. G06F 3/1239
                                                              358/1.15
2013/0100484 A1   4/2013 Hankins et al.
2013/0235418 A1* 9/2013 Tanaka ............... H04N 1/00228
                                                              358/1.15
2014/0211232 A1   7/2014 Ganesan et al.
2014/0372514 A1* 12/2014 Doui ..................... G06F 3/1222
                                                              709/203
2015/0268911 A1* 9/2015 Sato ..................... G06F 3/1292
                                                              358/1.14

OTHER PUBLICATIONS

International Search Report and Written Opinion (Forms PCT/ISA/210 and PCT/ISA/237) dated Jun. 29, 2016 in related International Application No. PCT/KR2016/001127 (12 pages).

* cited by examiner

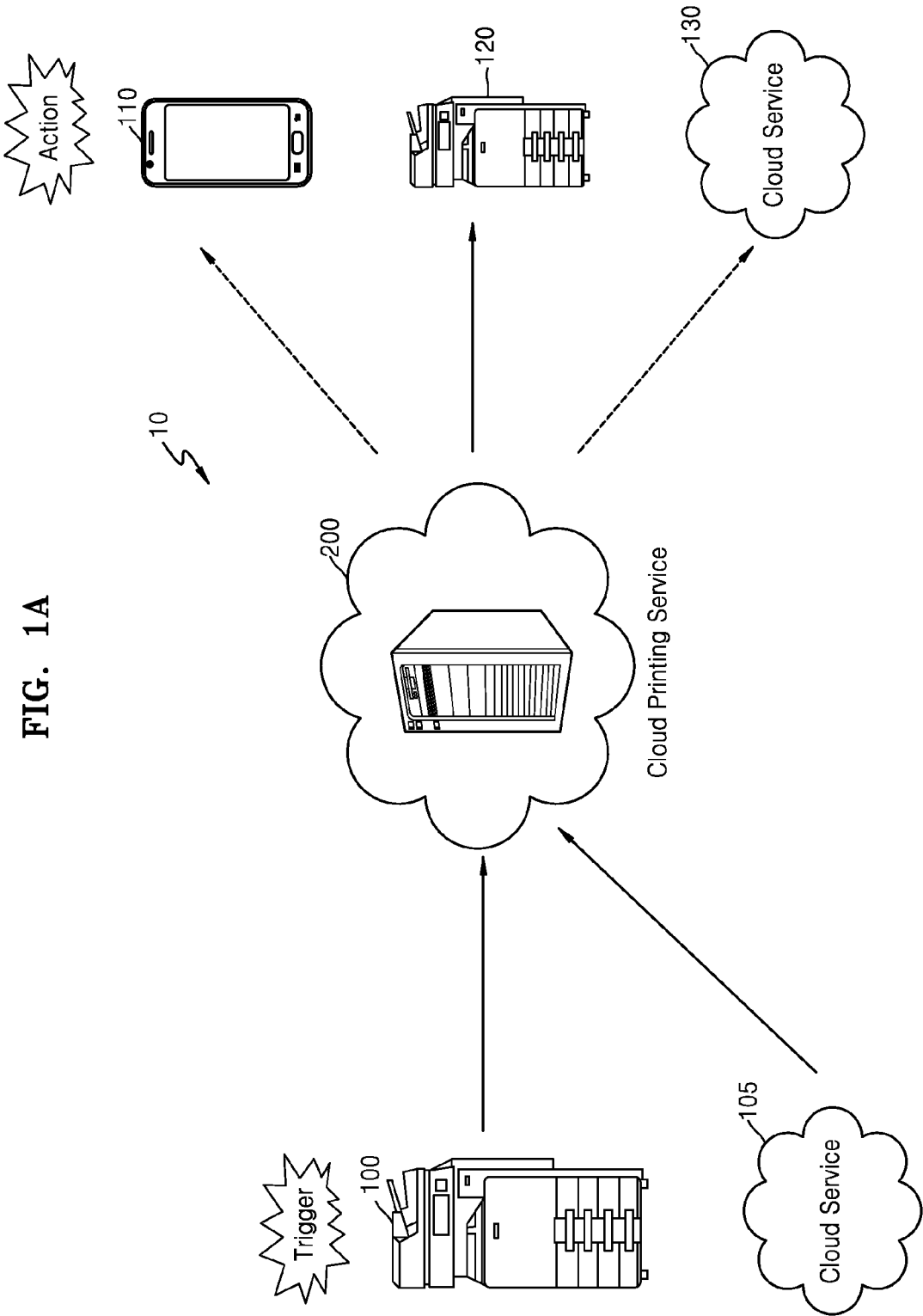

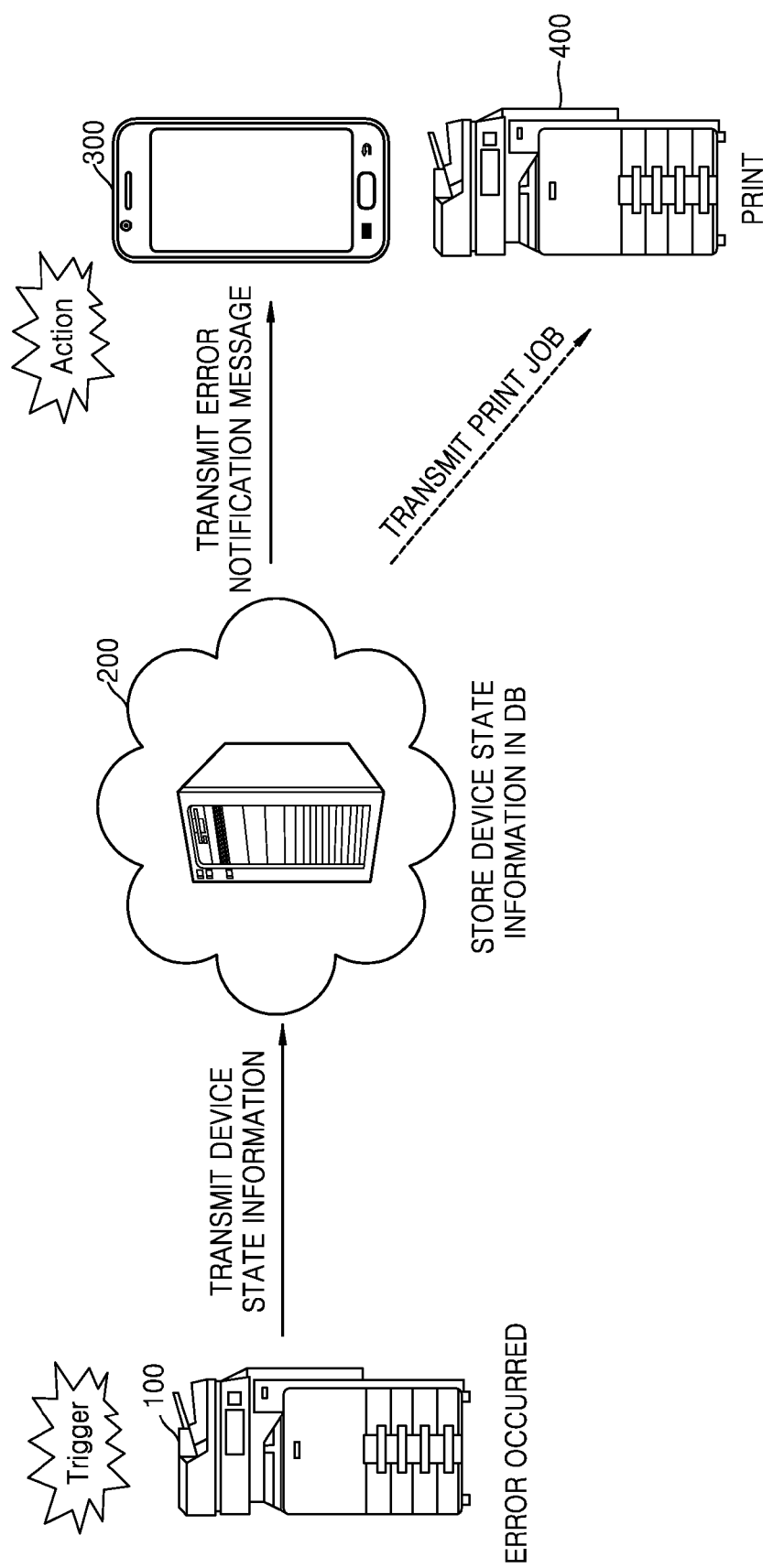

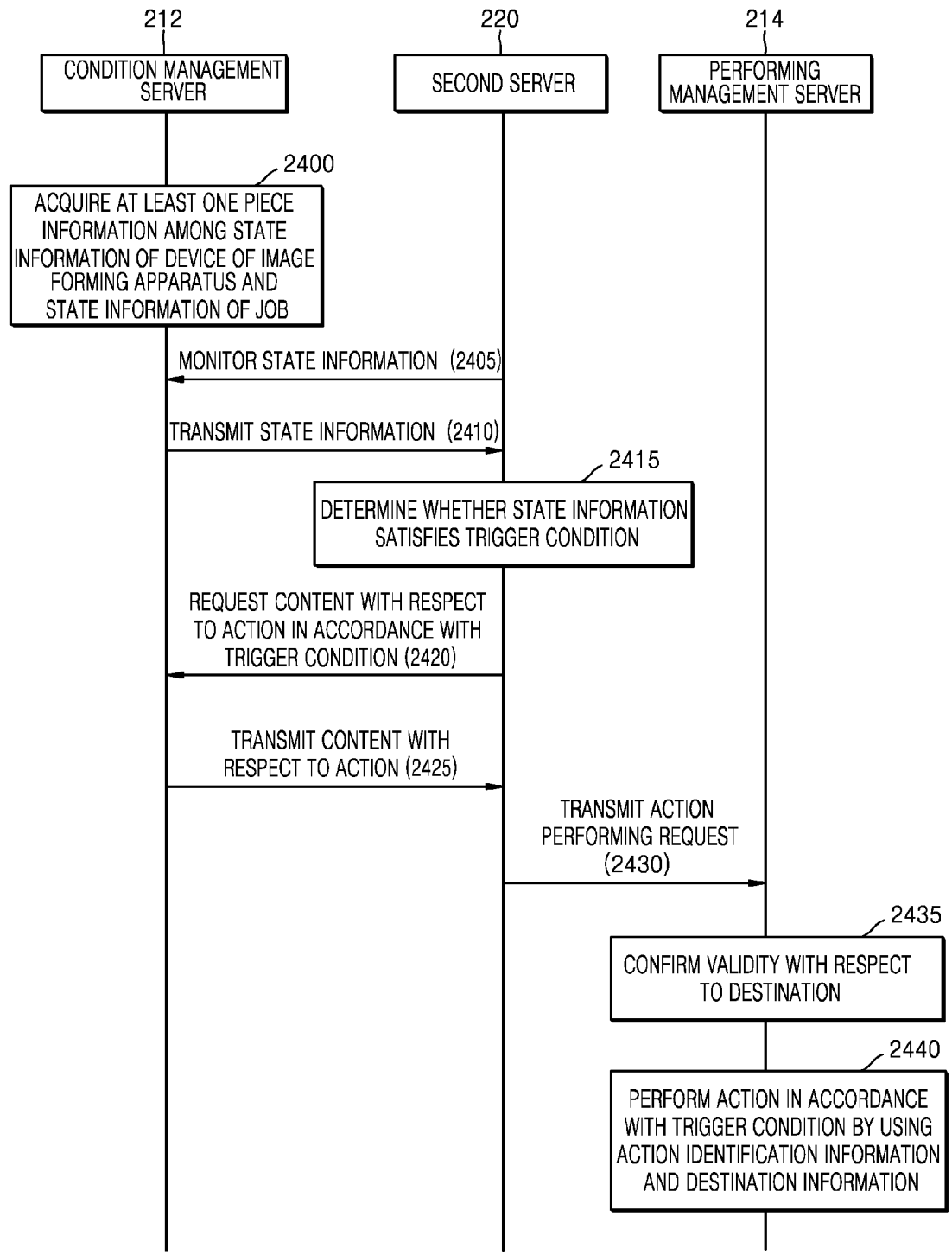

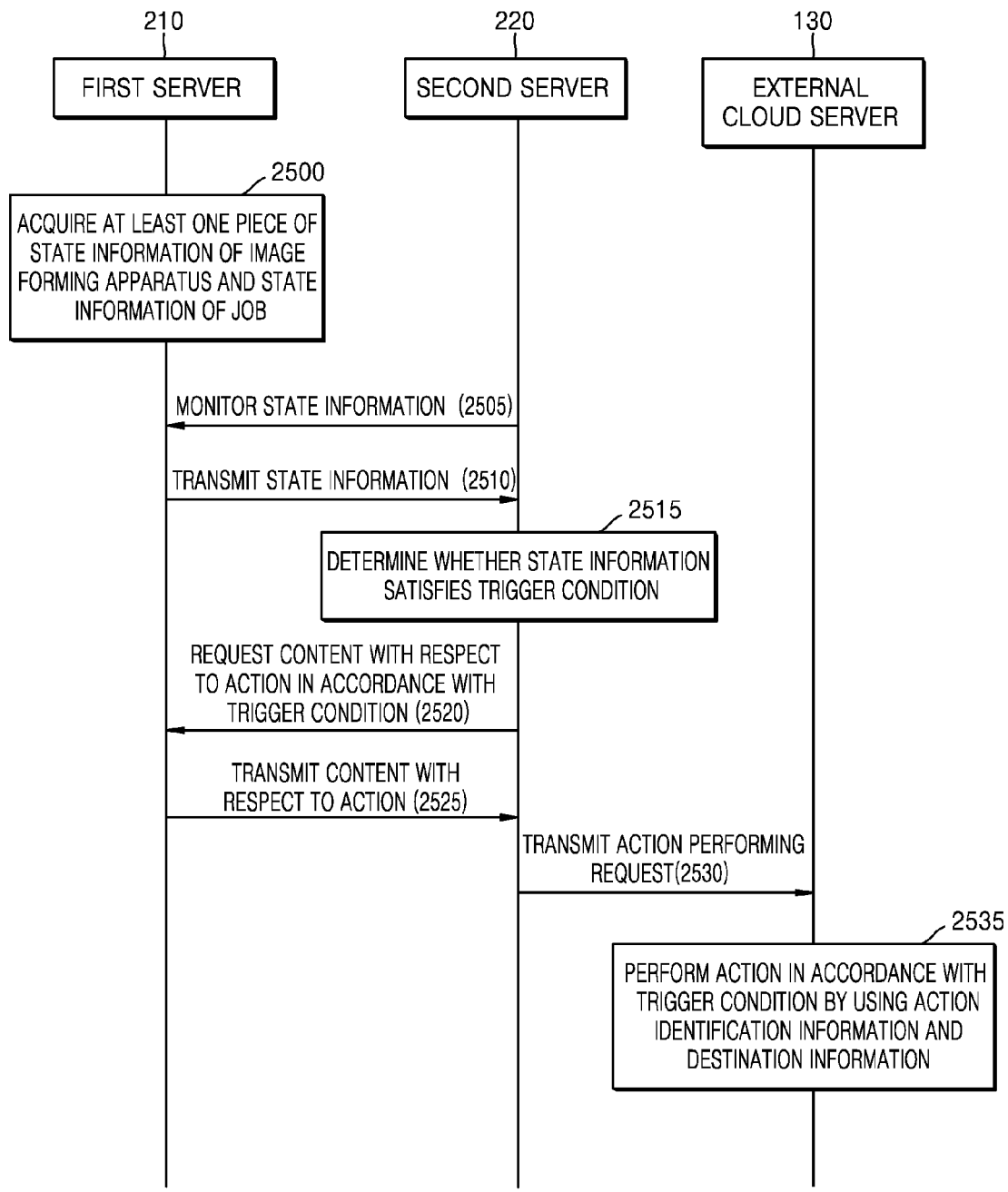

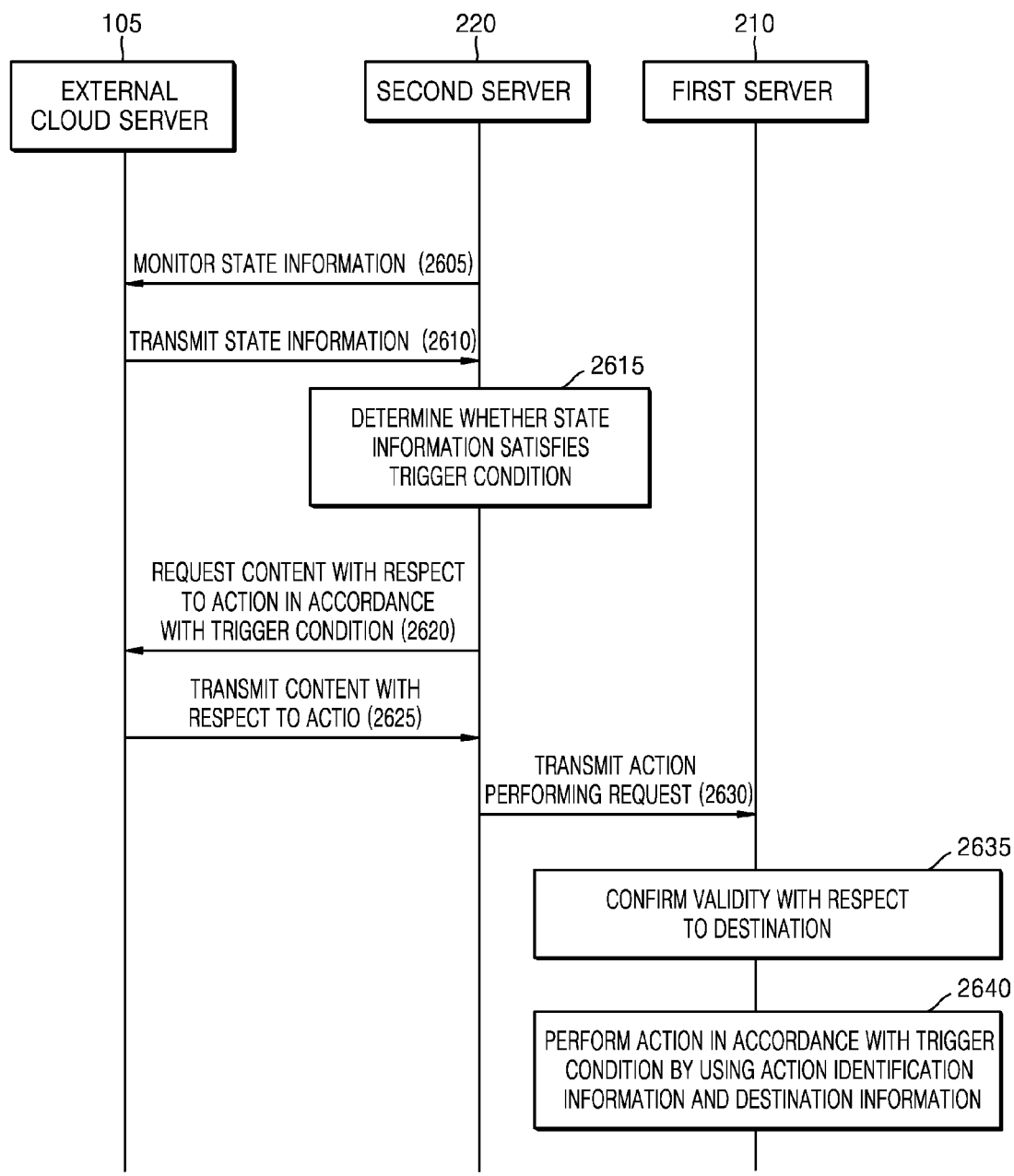

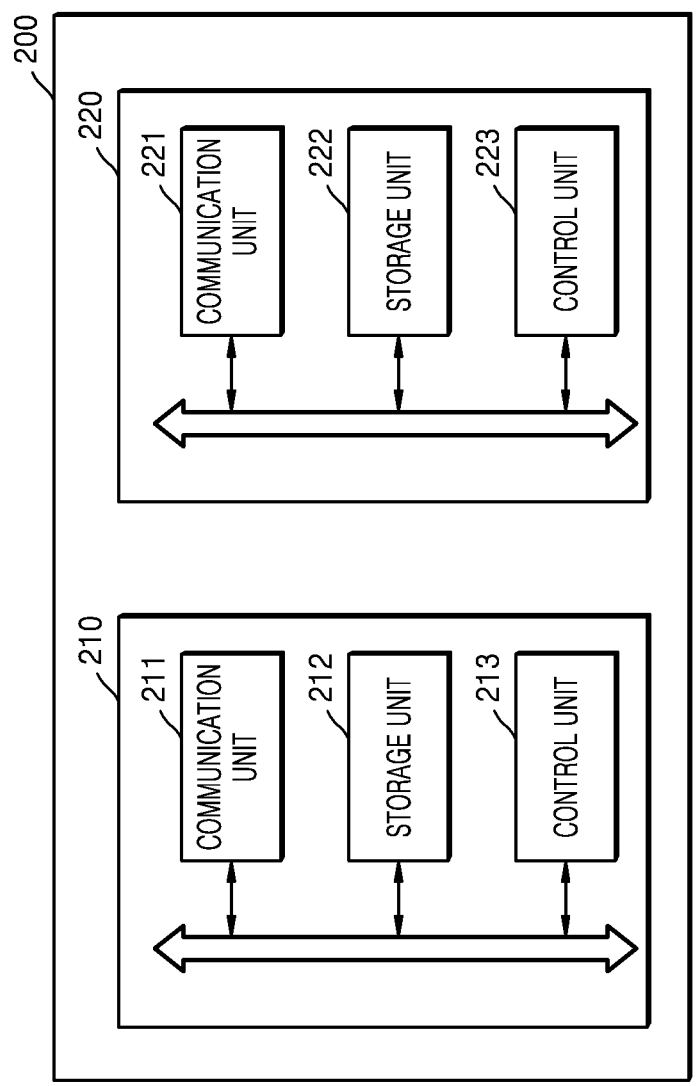

CLOUD PRINT SERVER AND METHOD OF PROVIDING AUTOMATIC CONNECTION SERVICE PERFORMED BY THE CLOUD PRINT SERVER

CROSS-REFERENCE TO RELATED APPLICATION

This application claims the benefit of Korean Patent Application No. 10-2015-0017469, filed on Feb. 4, 2015, in the Korean Intellectual Property Office, the disclosure of which is incorporated herein in its entirety by reference.

BACKGROUND

1. Field

The present disclosure relates to a cloud print server and a method of providing an automatic connection service performed by the cloud print server.

2. Description of the Related Art

Image forming apparatuses may be individual apparatuses such as printers, scanners, copiers, and facsimiles and multi-function products (MFPs) that integrate various functions of different apparatuses in one apparatus. Recently, a wired communication module such as an Ethernet module or a wireless communication module such as a Wi-Fi module, Wi-Fi Direct module, a near field communication (NFC) module, a Bluetooth module, a Zigbee module, or an infrared data association (IrDA) module has been included in an image forming apparatus so that the image forming apparatus may be connected to other user devices such as a mobile device and a laptop computer through a network. In addition, the image forming apparatus may access a cloud server by using the modules described above and upload or download a document to or from the cloud server.

SUMMARY

Provided are a cloud print server and a method of providing an automatic connection service performed by the cloud print server.

Provided is a non-transitory computer-readable recording medium storing a computer-executable program for executing the method.

Additional aspects will be set forth in part in the description which follows and, in part, will be apparent from the description, or may be learned by practice of the presented exemplary embodiments.

According to an aspect of an exemplary embodiment, a method of providing an automatic connection service by a cloud print server includes: acquiring at least one of state information of an image forming apparatus and state information of a job performed by the image forming apparatus; determining whether the acquired at least one of state information satisfies a performing condition previously stored in a second server; and if the previously stored performing condition is satisfied, performing a previously stored operation in accordance with the previously stored performing condition.

The cloud print server may include a first server and the second server, wherein the acquiring may include mapping and storing the state information of the image forming apparatus and identification information of the image forming apparatus, wherein the acquiring may be performed by the first server, and wherein the determining may include searching, by the second server, for a condition corresponding to the identification information of the image forming apparatus stored in the first server from among at least one condition previously stored in the second server and determining, by the second server, whether the state information corresponding to the identification information satisfies a found condition.

The cloud print server may include a first server and the second server, wherein the acquiring may include mapping and storing the state information of the job and identification information of a user requesting the job, wherein the acquiring may be performed by the first server, and wherein the determining may include searching, by the second server, for a condition corresponding to the identification information of the user stored in the first server from among at least one condition previously stored in the second server and determining, by the second server, whether the state information of the job corresponding to the identification information satisfies a found condition.

The performing of the previously stored operation may include: transmitting, to the first server, operation identification information indicating content of the previously stored operation and destination information indicating a location where the previously stored operation is performed, the operation identification information and the destination information being previously stored in the second server in order to perform the previously stored operation in accordance with the previously stored performing condition, wherein the transmitting is performed by the second server; and performing, by the first server, the previously stored operation in accordance with the previously stored performing condition based on the received operation identification information and destination information.

The method may further include: acquiring capability information of an image forming apparatus corresponding to the destination information, wherein the acquiring may be performed by the second server; and determining a print option used to perform the previously stored operation by using the acquired capability information, wherein the acquiring may be performed by the second server.

The performing of the previously stored operation may further include: transmitting, to an external cloud service server, operation identification information indicating content of the previously stored operation and destination information indicating a location where the previously stored operation is performed, the operation identification information and the destination information being previously stored in the second server in order to perform the previously stored operation in accordance with the previously stored performing condition, wherein the transmitting may be performed by the second server.

The method may further include: determining, by the second server, whether content is necessary for performing an operation in accordance with the condition; if it is determined that the content is necessary, receiving, by the second server, the content with respect to the operation that is to be performed from the first server; and transmitting, the second server, the received content to the first server.

The method may further include: acquiring, by the second server, identification information of a user corresponding to the image forming apparatus or the job performed by the image forming apparatus; and determining, by the second server, destination information indicating a location where the previously stored operation is performed based on the acquired identification information of the user.

The determining of the destination information may include transmitting, by the second server, a request for the destination information to the first server and receiving the destination information from the server.

According to an aspect of another exemplary embodiment, a cloud print server for providing an automatic connection service includes: a first server configured to acquire at least one of state information of an image forming apparatus and state information of a job performed by the image forming apparatus; and a second server configured to determine whether the acquired at least one of state information satisfies a previously stored performing condition, and if the previously stored performing condition is satisfied, further configured to perform a previously stored operation in accordance with the previously stored performing condition.

The first server may be further configured to map and store the state information of the image forming apparatus and identification information of the image forming apparatus, and the second server may be further configured to search for a condition corresponding to the identification information of the image forming apparatus stored in the first server from among at least one condition previously stored in the second server and to determine whether the state information corresponding to the identification information satisfies a found condition.

The first server may be further configured to map and store the state information of the job and identification information of a user requesting the job, and the second server may be further configured to search for a condition corresponding to the identification information of the user stored in the first server from among at least one condition previously stored in the second server and to determine whether the state information of the job corresponding to the identification information satisfies a found condition.

The second server may be further configured to transmit, to the first server, operation identification information indicating content of the previously stored operation and destination information indicating a location where the previously stored operation is performed, the operation identification information and the destination information being previously stored in the second server in order to perform the previously stored operation in accordance with the previously stored performing condition, and the first server may be further configured to perform the previously stored operation in accordance with the previously stored performing condition based on the received operation identification information and destination information.

The second server may be further configured to acquire capability information of an image forming apparatus corresponding to the destination information and to determine a print option for performing the previously stored operation based on the acquired capability information.

The second server may be further configured to transmit, to an external cloud service server, operation identification information indicating content of the previously stored operation and destination information indicating a location where the previously stored operation is performed, the operation identification information and the destination information being previously stored in the second server in order to perform the previously stored operation in accordance with the previously stored performing condition.

The second server may be further configured to determine whether content is necessary for performing an operation in accordance with the condition, and if it is determined that the content is necessary, the second server may be further configured to receive the content with respect to the operation that is to be performed from the first server and to transmit the received content to the first server.

The second server may be further configured to acquire identification information of a user corresponding to the image forming apparatus or the job performed by the image forming apparatus, and to determine destination information indicating a location where the previously stored operation is performed based on the acquired identification information of the user.

The second server may be further configured to transmit a request for the destination information to the first server and to receive the destination information from the server.

BRIEF DESCRIPTION OF THE DRAWINGS

These and/or other aspects will become apparent and more readily appreciated from the following description of the exemplary embodiments, taken in conjunction with the accompanying drawings in which:

FIGS. 1A through 1D are diagrams for schematically describing an automatic connection service provided by a cloud print server, according to an exemplary embodiment;

FIG. 2 is a diagram for describing an automatic connection service provided by a cloud print server, according to an exemplary embodiment;

FIG. 24 is a flowchart of a process in which the cloud print server of FIG. 1A provides an automatic connection service, according to an exemplary embodiment;

FIG. 25 is a flowchart of a process in which the cloud print server of FIG. 10 provides an automatic connection service, according to an exemplary embodiment;

FIG. 26 is a flowchart of a process in which the cloud print server of FIG. 1D provides an automatic connection service, according to an exemplary embodiment; and FIG. 27 is a block diagram of a configuration of a cloud print server, according to an exemplary embodiment.

DETAILED DESCRIPTION

Figure 1B:
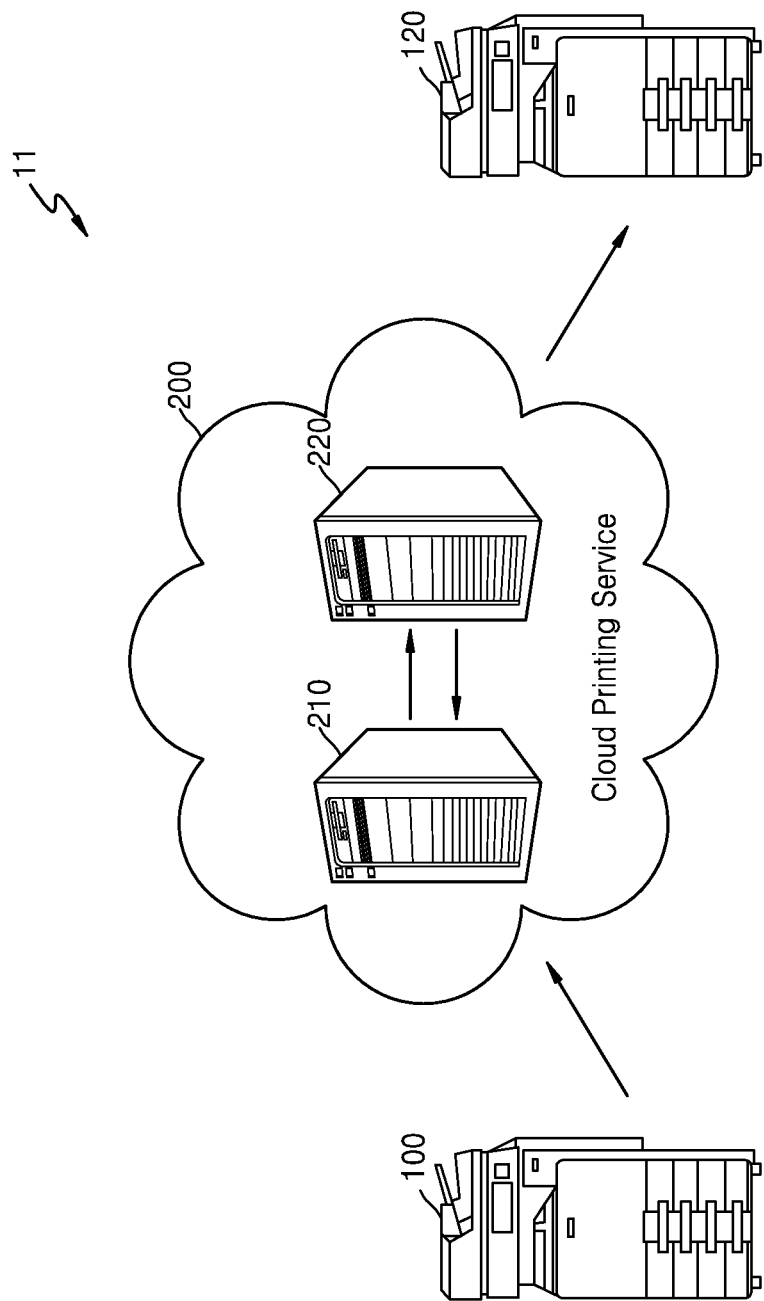

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, expressions such as "at least one of," when preceding a list of elements, modify the entire list of elements and do not modify the individual elements of the list.

In the specification, it should not be analysed that the terms such as "include" and "have" necessarily include all elements or steps described in the specification, and it should be analysed that some of the elements or steps may not be included, or additional elements or steps may be further included.

In addition, in the specification, although terms, such as 'first' and 'second', can be used to describe various elements, the elements cannot be limited by the terms. The terms can be used to classify a certain element from another element.

The exemplary embodiments relates to a method and system for providing a cloud print server and a cloud server for supporting the cloud print server, and detailed descriptions of the features well known to those of ordinary skill in the art will be omitted in the embodiments below.

FIGS. 1A through 1D are diagrams for schematically describing an automatic connection service provided by a cloud print server 200, according to an exemplary embodiment.

FIG. 1A shows a system 10 that includes the cloud print server 200 providing an automatic connection service and various apparatuses operating by being connected to the cloud print server 200.

The cloud print server 200 may basically provide a phone number based cloud print service. In more detail, the cloud print server 200 may use phone numbers of users to transmit content that is an image forming job target between the users. A user may input a phone number of another user to transmit the content, that is the image forming job target, to a device to which the phone number is allocated.

Referring to FIG. 1A, the cloud print server 20 of the system 10 may provide the automatic connection service. The automatic connection service is a service to control devices included in the system 10 to perform operations preset in accordance with a preset condition if the preset condition is satisfied.

For example, if an error occurs in an image forming apparatus 100, the cloud print server 200 may automatically detect the error to transmit an error message to a mobile terminal 110 of a manager that manages the image forming apparatus 100. The cloud print server 200 may transmit a job that is being performed by the image forming apparatus 100 to another image forming apparatus 120 to perform the job or may temporarily store data of the job that is being performed in an external cloud server 130.

Regarding the automatic connection service provided by the cloud print server 200, the preset condition is referred to as a trigger condition and the preset operation performed if the preset condition is satisfied is referred to as an action. The cloud print server 200 may store a workflow indicating a correspondence relationship between a preset trigger condition and the action preset in accordance with the trigger condition. The cloud print server 200 may refer to the stored workflow to determine if an event satisfying the trigger condition occurs and may perform an action corresponding to the event when it is determined that the even has occurred.

The workflow may include identification information of the action indicating content of the operation that is to be performed in accordance with the trigger condition, identification information of a target device by which the action is performed, or destination information indicating information of a location in which the action is performed. In more detail, the destination information may include information regarding the mobile terminal 110, the image forming apparatus 120, or the external cloud server 130 that is to perform the action.

The cloud print server 200 may set the trigger condition by using at least one of device state information that is information indicating a current state of the image forming apparatus 100 and job state information indicating a current state of the job performed by the image forming apparatus 100 in order to generate the workflow.

For example, the device state information may be information indicating the current state of the image forming apparatus 100 and may include information regarding whether an error occurs, consumables are lacking, power is turned on/off, etc. The device state information may further include detailed information indicating details regarding the state information.

The job state information may be information indicating the current state of the job that is to be performed by using the cloud print server 20 or the external cloud sever 130 and may include information regarding whether the job is finished, the job is requested, the job is in progress, a new job is received, etc.

Referring to FIG. 1A, if at least one piece of state information acquired from the image forming apparatus 100 or another external cloud server 105 satisfies a preset trigger condition, the cloud print server 200 may control the mobile terminal 110, the image forming apparatus 120, or the external cloud server 130 to perform an action preset in accordance with the satisfied trigger condition.

Figure 1C:
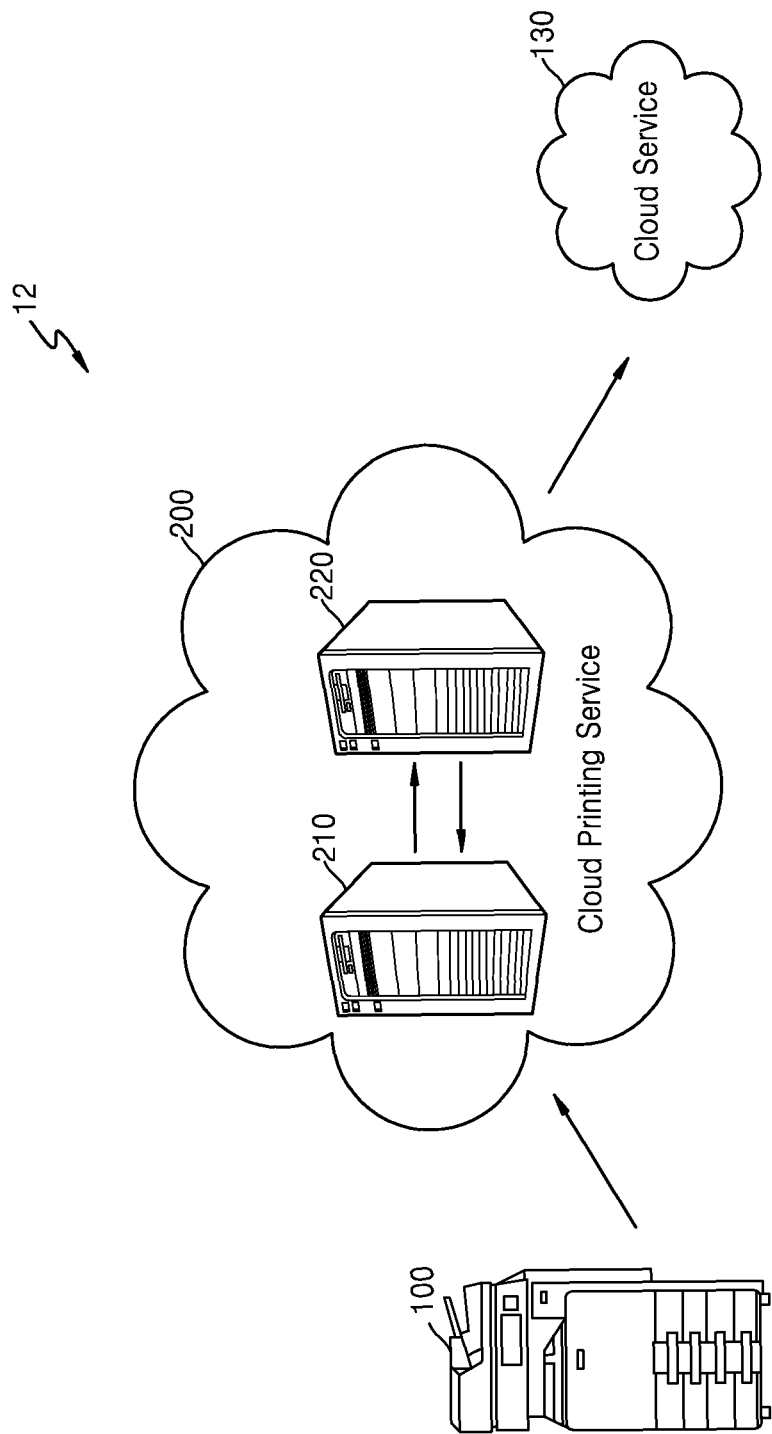
Figure 1D:
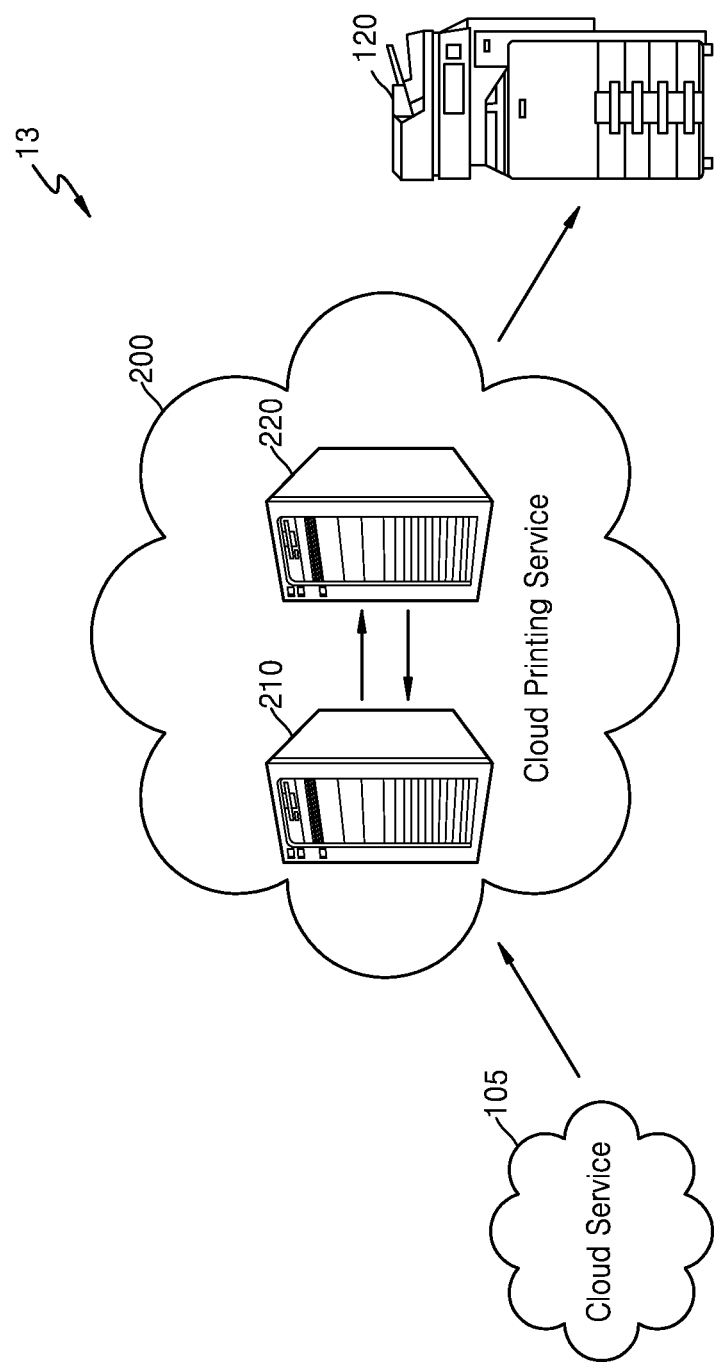

FIGS. 1B through 1D are diagrams of examples of systems 11, 12, and 13 including the cloud print server 200 of FIG. 1A.

Referring to FIG. 1B, the system 11 may include the image forming apparatus 100, the cloud print server 200, and the image forming apparatus 120.

In the system 11, the cloud print server 200 may determine whether a trigger condition is satisfied by using state information of the image forming apparatus 100 or job state information received from the image forming apparatus 100 and may control the image forming apparatus 120 to perform an action corresponding to the trigger condition.

For example, in a case where an error occurs in the image forming apparatus 100, the cloud print server 200 may transmit a job that is being performed by the image forming apparatus 100 to the image forming apparatus 120 to print the job.

In this regard, the cloud print server 200 may be implemented as a first server 210 and a second server 220.

The first server 210 may be a server storing and managing state information of the image forming apparatus 100 and information regarding the image forming apparatus 100. The information regarding the image forming apparatus 100 may include, for example, manager information of the image forming apparatus 100, capability information, etc.

A user may generate a workflow with reference to information regarding a registration device available by the user as the image forming apparatus stored in the first server 210. The first server 210 may receive and store the state information of the image forming apparatus 100 from the image forming apparatus 100 and provide the state information to the second server 220. The first server 210 may receive a request to perform an action from the second server 220 and may perform the action. The first server 210 may be separately implemented as a condition management server and a performing management server if necessary.

The second server 220 may control a general operation of the cloud print server 200 to perform an action corresponding to a preset condition if the preset condition is satisfied with reference to the stored workflow. The second server 220 may receive the state information of the image forming apparatus 100 from the first server 210, may determine whether the preset condition is satisfied, and may control the first server 210 to transmit a job to the image forming apparatus 120 if the preset condition is satisfied.

In more detail, the second server 220 may transmit a request for state information to the first server 210 by using a poling method or a long polling method, thereby receiving device state information or job state information. Alternatively, whenever the state information stored by using a pushing method is updated, the first server 210 may transmit the updated state information to the second server 220 so that the second server 220 may receive the device state information.

The cloud print server 200 may be implemented as the first server 210 that is an internal module of the image forming apparatus 100 and the second server 220 that is a management module acting as the first server 210.

Operations of the first server 210 and the second server 220 will be described in more detail with reference to exemplary embodiments of FIGS. 2 through 5 later.

Figure 10:
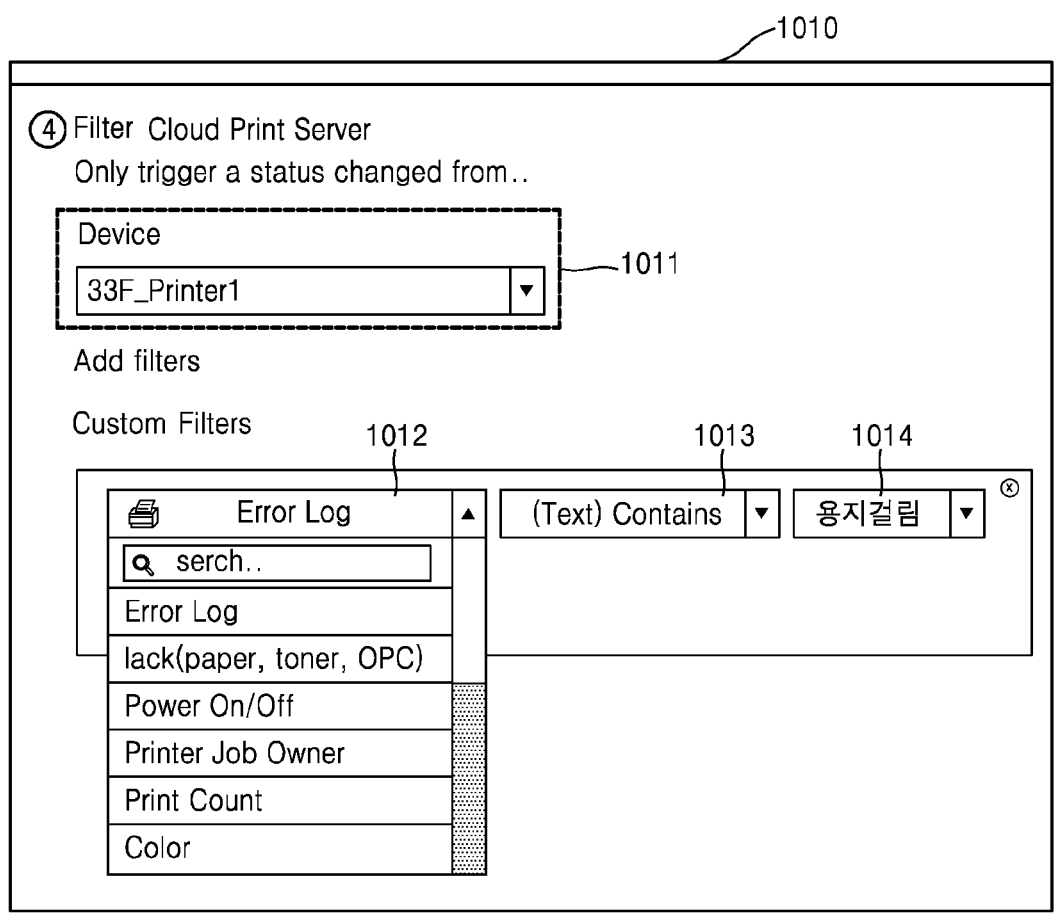
FIGS. 10 and 11 are diagrams of user interface screens for setting filter items of an automatic connection service provided by a cloud print server, according to an exemplary embodiment.

Referring to FIG. 10, the system 12 may include the image forming apparatus 100, the cloud print server 200, and the external cloud server 130.

In the system 12, the cloud print server 200 may determine whether a trigger condition is satisfied by using state information of the image forming apparatus 100 or job state information received from the image forming apparatus 100 and may control the external cloud server 130 to perform an action corresponding to the trigger condition.

The external cloud server 130 may include a cloud server providing a cloud storage service such as Dropbox, Gmail, Google Drive, Ever Note, etc. or a cloud server providing a social network service such as Instagram, Facebook, etc.

For example, in a case where the image forming apparatus 100 completely scans a document, the cloud print server 200 may allow a scanned image file to be stored or published by a service provided by the external cloud server 130.

For example, the cloud print server 200 may be implemented as the first server 210 and the second server 220. The second server 220 may receive the job state information from the first server 210 and, if the trigger condition is satisfied, may transmit the scanned image file and a request for the action to the external cloud server 130.

Operations of the first server 210 and the second server 220 will be described in more detail with reference to exemplary embodiments of FIGS. 18 and 19 later.

Referring to FIG. 1D, the system 13 may include the external cloud server 105, the cloud print server 200, and the image forming apparatus 120.

In the system 13, the cloud print server 200 may determine whether a trigger condition is satisfied by using state information of an image forming job received from the external cloud server 105 and may control the image forming apparatus 120 to perform an action corresponding to the trigger condition.

For example, if a new email is received in a user account of the external cloud server 105 providing an email service, the cloud print server 200 may allow the image forming apparatus 120 to print content of the received email.

In this regard, the cloud print server 200 may be implemented as the first server 210 and the second server 220. The second server 220 may directly receive job state information from the external cloud server 105 or from the first server 210. The second server 220 may receive the job state information and, if the trigger condition is satisfied, may control the first server 210 to allow the image forming apparatus 120 to print the content of the received email.

Operations of the first server 210 and the second server 220 will be described in more detail with reference to exemplary embodiments of FIGS. 20 and 21 later.

FIG. 2 is a diagram for describing an automatic connection service provided by the cloud print server 200, according to an exemplary embodiment.

Referring to FIG. 2, in a case where an error occurs in the image forming apparatus 100, the cloud print server 200 may inform a manager managing the image forming apparatus 100 of occurrence of the error. The cloud print server 200 may transmit a job that is being performed by the image forming apparatus 100 to another image forming apparatus 400 to perform the job.

In more detail, in a case where the error occurs in the image forming apparatus 100, the image forming apparatus 100 may transmit device state information of the image forming apparatus 100 to the cloud print server 200.

The device state information of the image forming apparatus 100 may be information indicating a current state of the image forming apparatus 100 and may include information regarding whether the error occurs, consumables are lacking, power is turned on/off, etc. For example, the device state information of the image forming apparatus 100 may include state information such as "normal operation", "error occurred", "refill consumables", "power on", "power off", etc.

The device state information of the image forming apparatus 100 may further include detailed information indicating details of the device state information. For example, the device state information of the image forming apparatus 100 may include the detailed information such as "paper jam", "refill paper", "refill toner", "power stop", etc.

The cloud print server 200 may receive the device state information of the image forming apparatus 100 from the image forming apparatus 100 and may determine whether a preset trigger condition is satisfied by using the received state information. If the trigger condition is satisfied, the cloud print server 200 may perform an action corresponding to the trigger condition.

For example, if the cloud print server 200 receives the device state information "error occurred (paper jam)" from the image forming apparatus 100, the cloud print server 200 may transmit a notification message such as "paper jam, $1^{st}$ printer, $32^{nd}$ floor" to a mobile terminal 300 of the manager managing the image forming apparatus 100. The cloud print server 200 may transmit the job that is being performed by the image forming apparatus 100 to the image forming apparatus 400 to perform the job.

Figure 3:
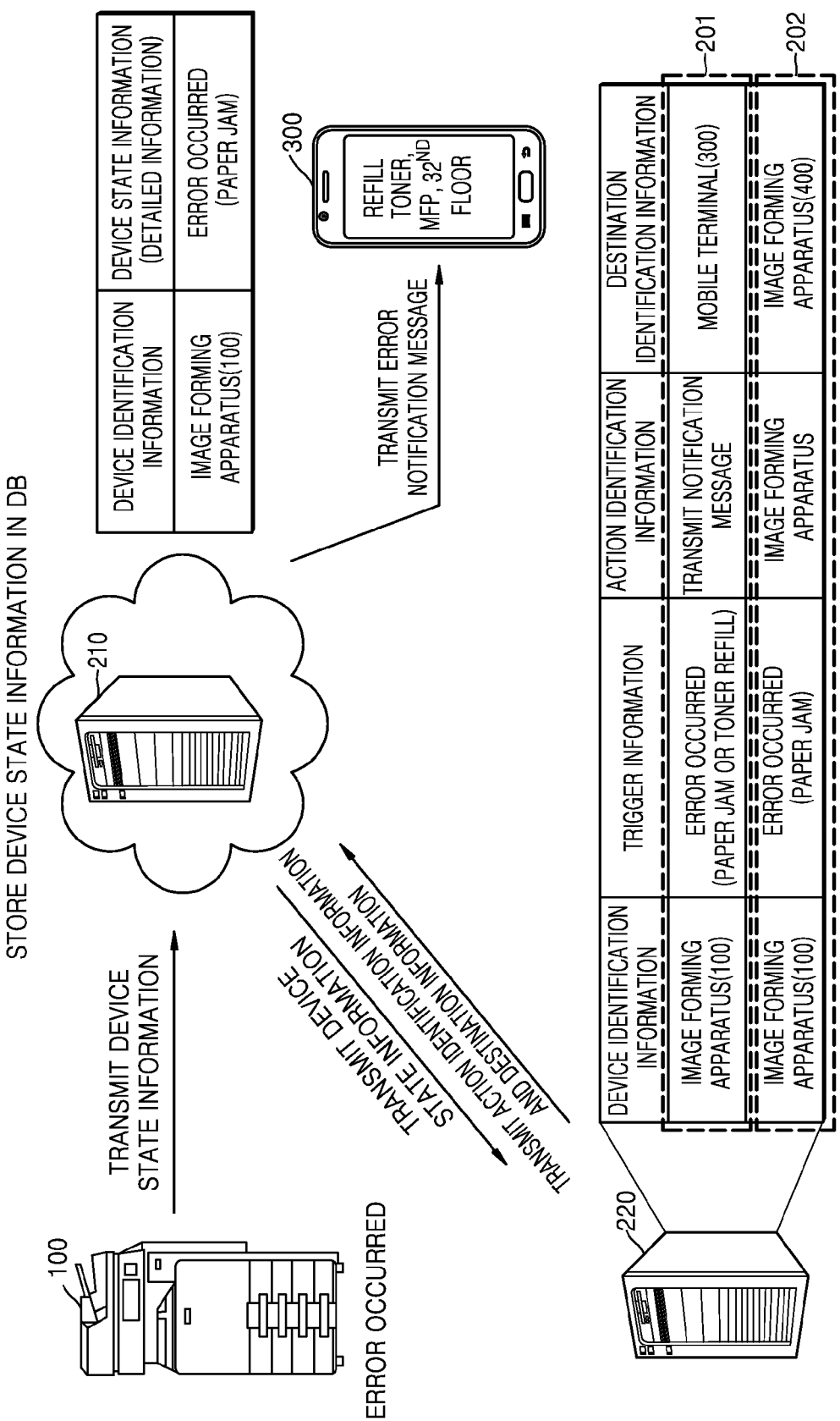
FIG. 3 is a diagram for describing a detailed method of providing the automatic connection service of FIG. 2, according to an exemplary embodiment.

FIG. 3 is a diagram for describing a detailed method of providing the automatic connection service of FIG. 2, according to an exemplary embodiment.

If an error occurs in the image forming apparatus 100, the cloud print server 200 may inform a manager managing the image forming apparatus 100 of occurrence of the error.

If the error occurs in the image forming apparatus 100, the image forming apparatus 100 may transmit device state information "error occurred (paper jam)" of the image forming apparatus 100 to the first server 210, and the first server 210 may receive and store the device state information "error occurred (paper jam)" of the image forming apparatus 100 from the image forming apparatus. In this regard, whenever the device state information is changed, the image forming apparatus 100 may transmit the changed device state information to the first server 210 to update the device state information. The first server 210 may map and store the received device state information with identification information of the image forming apparatus 100 or identification information of a user.

The second server 220 may periodically transmit a request for the device state information of the image forming apparatus 100 to the first server 210 and thus may receive the device state information "error occurred (paper jam)" of the image forming apparatus 100 from the first server 210.

Referring to FIG. 3, the second server 220 may store a preset workflow 201 and a workflow 202.

The second server 220 may search for the workflow corresponding to identification information of the image forming apparatus 100 among previously stored one or more conditions. The second server 220 may determine whether the received device state information "error occurred (paper jam)" satisfies a trigger condition of the workflow 201 with reference to the found workflow 201. If it is determined that the trigger condition "error occurred (paper jam or toner refill)" of the workflow 201 is satisfied, the second server 220 may perform an action "transmit a notification message" corresponding to the trigger condition.

The second server 220 may transmit action identification information and destination information of the workflow 201 and an action performing request to the first server 210 to control to perform the action of the workflow 201.

The first server 210 may transmit a notification message such as "paper jam, $1^{st}$ printer, $32^{nd}$ floor" to the mobile terminal 300 based on the received action identification information and destination information of the workflow 201.

Figure 4:
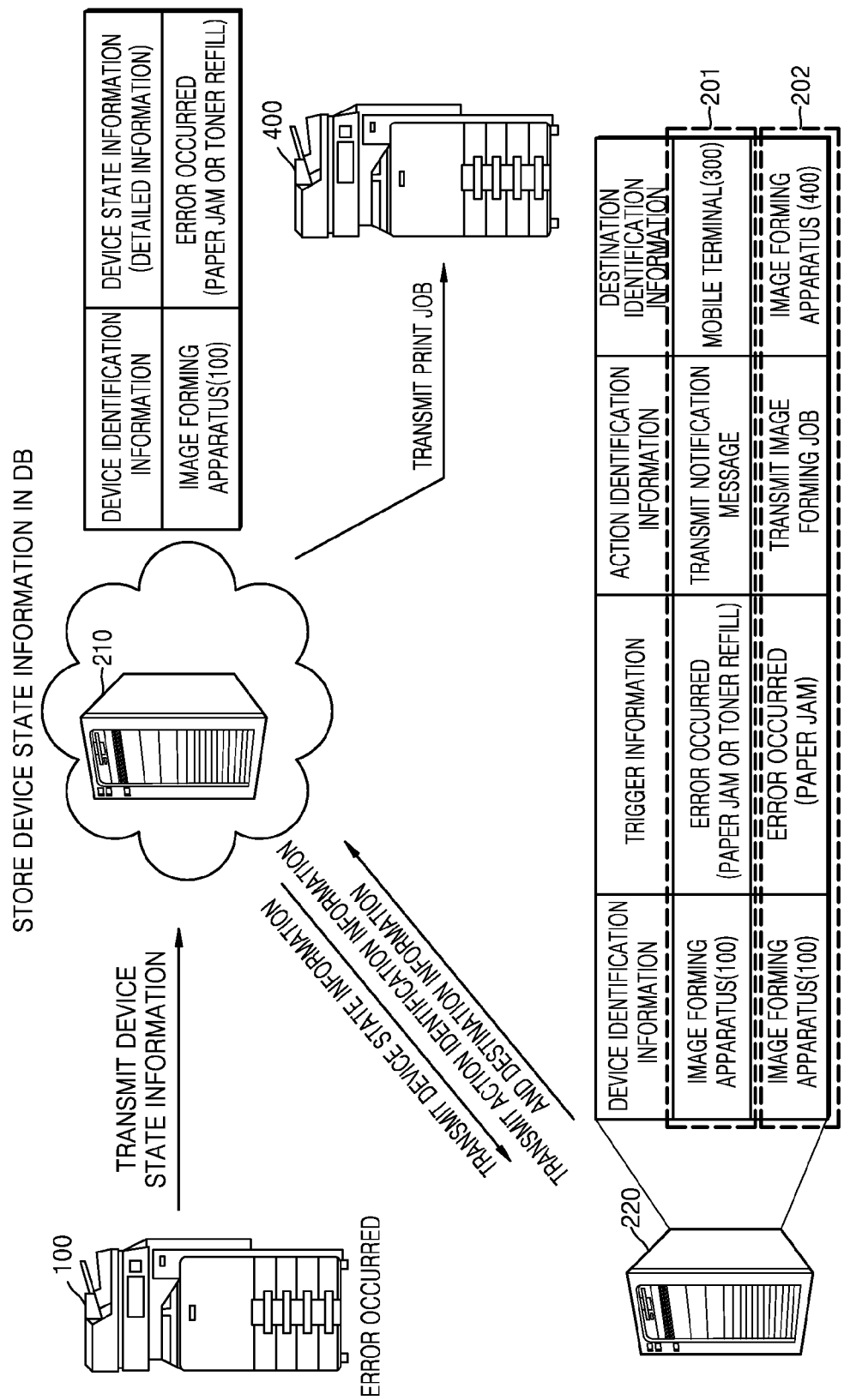
FIG. 4 is a diagram for describing a detailed method of providing the automatic connection service of FIG. 2, according to another exemplary embodiment.

FIG. 4 is a diagram for describing a detailed method of providing the automatic connection service of FIG. 2, according to another exemplary embodiment;

If an error occurs in the image forming apparatus 100, the cloud print server 200 may transmit an image forming job that is being performed by the image forming apparatus 100 to the image forming apparatus 400.

In more detail, if an error occurs in the image forming apparatus 100, the image forming apparatus 100 may transmit device state information "error occurred (paper jam)" of the image forming apparatus 100 to the first server 210, and the first server 210 may receive and store the device state information "error occurred (paper jam)" of the image forming apparatus 100 from the image forming apparatus.

The second server 220 may periodically transmit a request for the device state information of the image forming apparatus 100 to the first server 210 and thus may receive the device state information "error occurred (paper jam)" of the image forming apparatus 100 from the first server 210.

Referring to FIG. 4, the second server 220 may store a preset workflow 201 and a workflow 202.

The second server 220 may determine whether received device state information "error occurred (toner refill)" satisfies a trigger condition with reference to the workflow 201 found based on identification information of the image forming apparatus 100. If it is determined that the trigger condition "error occurred (paper jam or toner refill)" of the workflow 201 is satisfied, the second server 220 may control to perform an action "transmit a notification message" corresponding to the trigger condition.

The second server 220 may determine whether received device state information "error occurred (paper jam)" satisfies a trigger condition with reference to the workflow 202 found in accordance with the identification information of the image forming apparatus 100. If it is determined that the trigger condition "error occurred (paper jam)" of the workflow 202 is satisfied, the second server 220 may control to perform an action "transmit an image forming job" corresponding to the trigger condition.

The second server 220 may transmit action identification information and destination information of the workflow 201 and action identification information and destination information of the workflow 202 to the first server 210 to control to perform the action of the workflow 201 and the action of the workflow 202.

The first server 210 may transmit a notification message to a manager managing the mobile terminal 300 based on the received action identification information and destination information of the workflow 201. The first server 210 may transmit the image forming job to the image forming apparatus 400 based on the received action identification information and destination information of the workflow 202.

Figure 5:
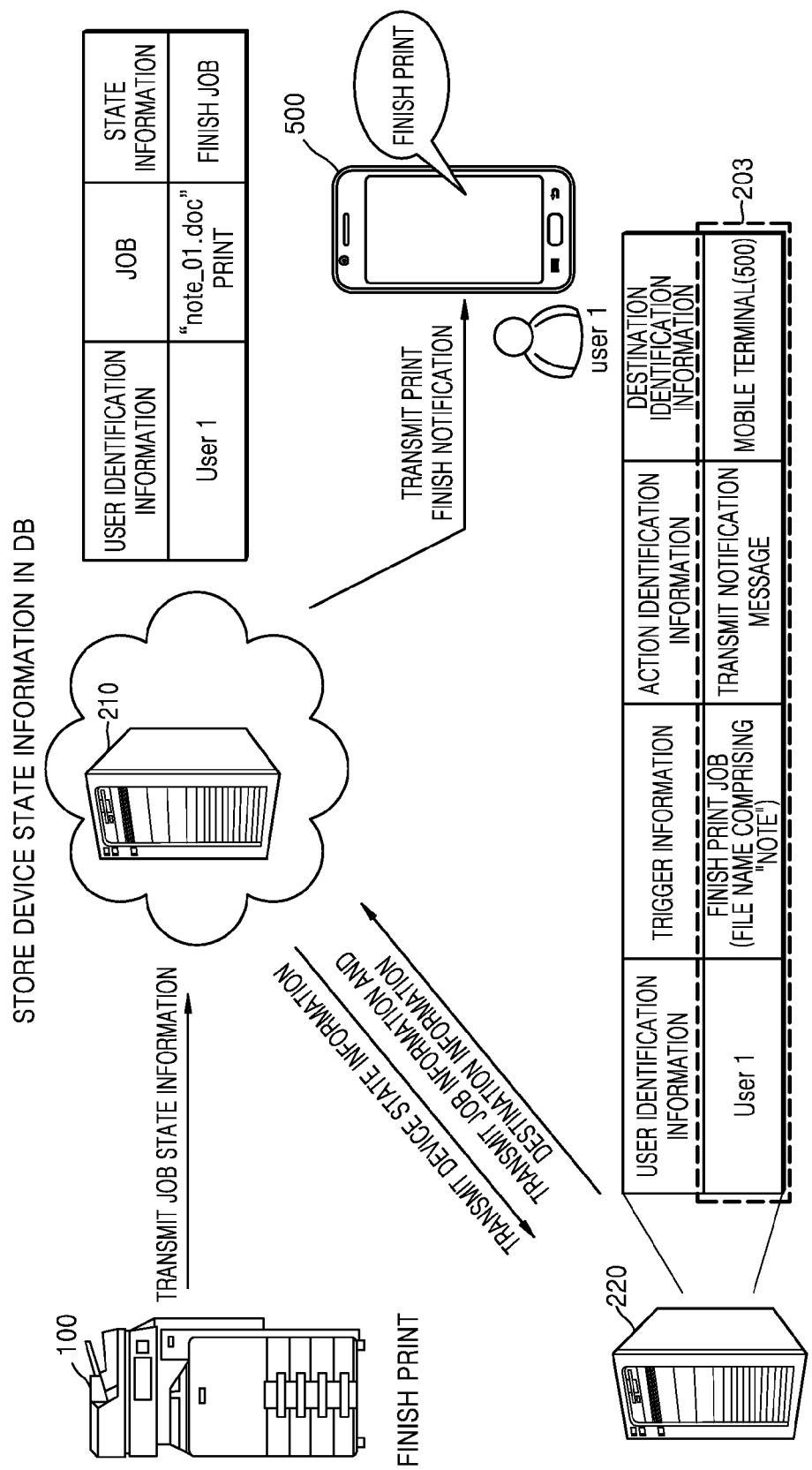
FIG. 5 is a diagram for describing an automatic connection service provided by a cloud print server, according to another exemplary embodiment.

FIG. 5 is a diagram for describing an automatic connection service provided by the cloud print server 200, according to another exemplary embodiment.

FIG. 5 shows a process of providing the automatic connection service in a case where job state information indicating a current state of a job that is being performed by the image forming apparatus 100 is changed. For example, if the job that is being performed by the image forming apparatus 100 is finished, the cloud print server 200 may transmit a print notification message to a mobile terminal 500 of a user of the job.

In a case where a print job is finished, the image forming apparatus 100 may transmit job state information of the print job, along with user identification information of the user of the job, to the first server 210.

Job state information may be information indicating a current state of a job that may be performed by using a cloud print server or an external cloud server and may include information regarding whether to request the job, whether to proceed with the job, etc. For example, the job state information may include information such as "request print", "request scan", "standby print", "pause job", "finish job", "receive job", etc.

The job state information may further include detailed information indicating details of the job state information. For example, the job state information may further include the detailed information such as a file name of job data, file content, a file type, a page number, a print number, etc.

For example, if the image forming apparatus 100 finishes a job of printing a file "note_01.doc", the image forming apparatus 100 may transmit job state information "finish print job" to the first server 210, and the first server 210 may receive the job state information "finish print job" from the image forming apparatus 100 and map and store the job state information and user identification information. The job state information "finish job" may further include information such as a file name that is detailed information of the finished job.

The second server 220 may periodically transmit device state information of the image forming apparatus 100 to the first server 210, and thus receive the job state information "finish job" from the first server 210.

The second server 220 may search for a previously stored workflow corresponding to the user identification information and may determine whether the received job state information "finish print job" satisfies a trigger condition with reference to the found workflow. If it is determined that the trigger condition is satisfied, the second server 220 may control to perform an action corresponding to the trigger condition with reference to the workflow.

Referring to FIG. 5, the second server 220 may store a preset workflow 203.

Since a trigger condition of the workflow 203 is satisfied, the second server 220 may control to perform an action "transmit notification message" corresponding to the trigger condition.

The second server 220 may transmit action identification information and destination information of the workflow 203 to the first server 210 to control to perform the action of the workflow 203.

The first server 210 may transmit a message such as "finish print note_01.doc" to the mobile terminal 500 of the user user1 of the job based on the received action identification information and destination information.

Figure 6:
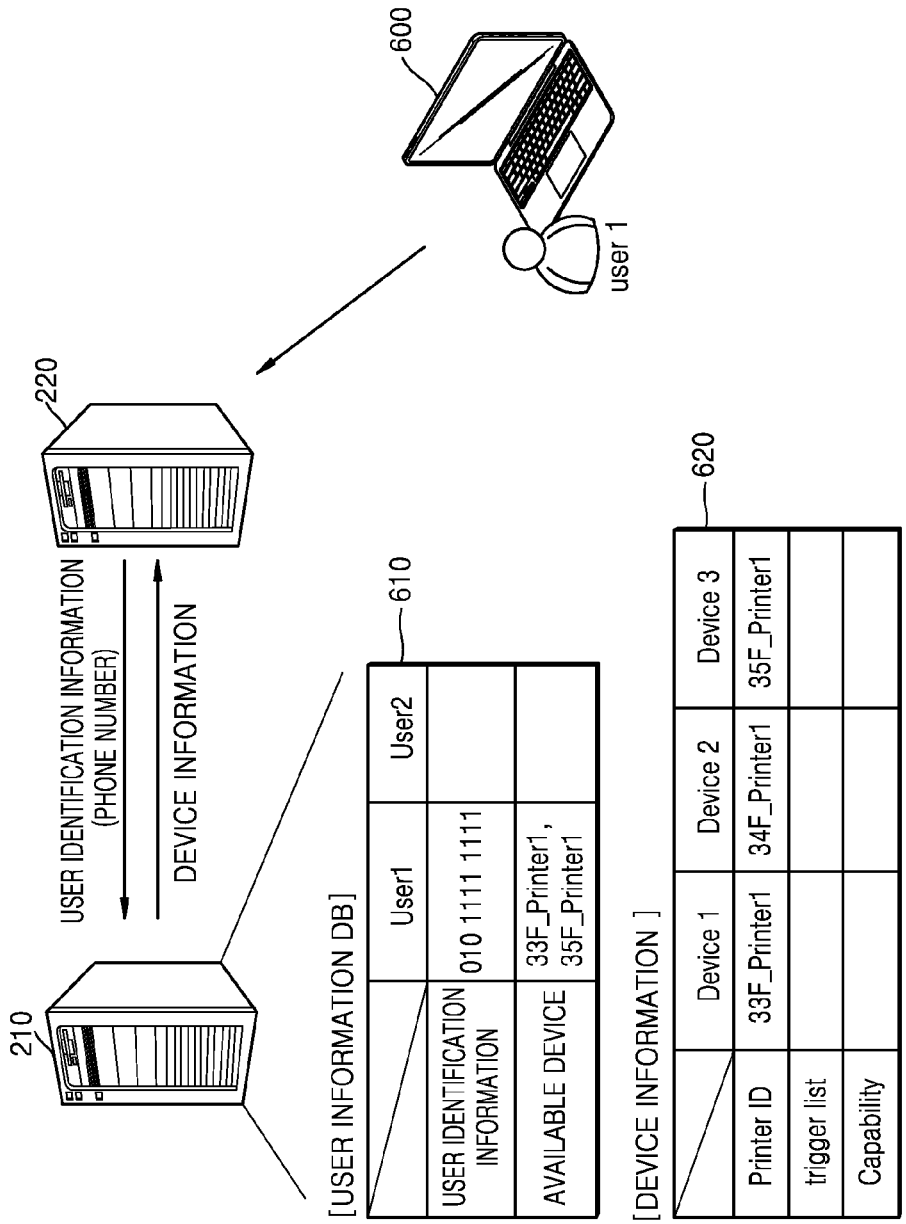
FIG. 6 is a diagram for describing a process of generating a workflow for providing an automatic connection service in a cloud print server, according to an exemplary embodiment.

FIG. 6 is a diagram for describing a process of generating a workflow for providing an automatic connection service in the cloud print server 200, according to an exemplary embodiment The automatic connection service provided by the cloud print server 200 may be preset and provided by using workflows stored in the second server 220. Workflows may be defined as a correspondence relationship between a preset trigger condition and a preset action in accordance with the trigger condition. That is, workflows may be configured as preset trigger and action. Workflows may be generated by a system manager at a time or may be individually generated by individual users registered to use a system.

Referring to FIG. 6, the use user1 may access the second server 220 via a user device 600, may generate the workflow, and store the workflow in the second server 220. In a case where the use user1 generates the workflow by using the user device 600, the user device 600 may receive an input of user identification information from the user user1 and may transmit the received user identification information "010 1111 1111" to the second server 220.

The user identification information may be intrinsic information used to identify users and may include, for example, phone numbers, registered IDs used in the system, email addresses, etc.

The second server 220 may use the received user identification information to perform user authentication and acquire information regarding a device available by a user.

In more detail, the second server 220 may transmit the received user identification information to the first server 210 and may receive an authentication result from the first server 210. The first server 210 may store registration user information including the user identification information in a user information database 610. The first server 210 may use the received user identification information to determine whether a user of the user identification information is a valid user and, if the user is the valid user, transmit a valid authentication result to the second server 220. In a case where the second server 220 receives the valid authentication result, the second server 220 may authorize the user user1 who inputs the user identification information to generate the workflow.

The second sever 220 may acquire information regarding registration devices available by the user from the first server 210. The first server 210 may store a list of the registration devices available by the user corresponding to the user identification information in the user information database 610. The first server 210 may acquire identification information 33F_Printer1 and 35F_Printer1 of the registration devices corresponding to the received user identification information user1 with reference to the user information database 610 and may transmit the registration device list to the second server 220.

The second server 220 may use the registration device list available by the user acquired from the first server 210 to provide the registration device list to the user. The user may use one of the registration devices selected by the user from the registration device list to generate a workflow.

For example, the user may select one device from the registration device list, and, if an error occurs in the selected device, may generate the workflow to transmit a notification message to a mobile terminal of the user.

The second server 220 may acquire an event list with respect to the registration devices from the first server 210. The first server 210 may store the event list that may be set as a trigger condition in accordance with the registration devices in a device information database 620.

In more detail, the second server 220 may provide an available registration device list to the user via the user device 600, receive one device selected by the user among the available registration device list from the user, and receive identification information of the selected device. For example, in a case where the user user1 selects a device Device 1, the second server 220 may receive device identification information 33F_Printer1 from the user device 600.

The second server 220 may use the received device identification information to receive the event list that may be set as the trigger condition in accordance with the registration devices from the first server 210. For example, the second server 220 may transmit the device identification information 33F_Printer1 and a request for the event list to the first server 210, and the first server 210 may transmit the event list corresponding to the received device identification information to the second server 220 with reference to the device information database 620.

The second server 220 may provide the event list acquired from the first server 210 to the user via the user device 600.

The user may select one from the event list as a trigger condition to generate a workflow.

The second server 220 may receive a filter item list with respect to the selected trigger condition and provide the filter item list to the user. The first server 210 may store the filter item list for in detail setting the trigger condition.

In more detail, the second server 220 may receive the filter item list that may be set as the filter items in accordance with the trigger condition from the first user 210 by using the selected trigger condition. For example, the second server 220 may transmit a request for the filter item list to the first server 210, and the first server 210 may transmit the received device identification information and the filter item list corresponding to events to the second server 220 with reference to the device information database 610.

The second server 220 may provide the filter item list acquired from the first server 210 to the user via the user device 600. The user may generate a workflow based on the filter item list. For example, the user may select one or more filter items from the filter item list and thus may set a filter condition of the workflow in detail.

The second server 220 may acquire capability information with respect to the registration devices from the first server 210. The first server 210 may store the capability information indicating device performance in accordance with the registration devices in the device information database 620.

In more detail, the second server 220 may receive one device selected by the user from the registration device list form the user via the user device 600 and receive identification information of the selected device. The second server 220 may transmit the received device identification information to the first server 210 to request the capability information. The first user 210 may transmit the capability information corresponding to the device identification information to the second server 220 with reference to the device information database 620.

The second server 220 may use the capability information acquired from the first server 210 to provide an option corresponding to the capability information to the user. The option provided to the user may be an option regarding a print job. For example, the second server 220 may provide an option to which the acquired capability information is applied to the user in order to induce the user to select an action in accordance with capability of an image forming apparatus in a case where the image forming apparatus performs the action.

A sequence for selecting a device, a trigger condition, and a filter item that are selected by the second server 220 to generate the workflow may be merely an example and the exemplary embodiment is not limited thereto. For example, according to another exemplary embodiment, the second server 220 may firstly select the trigger condition based on a user input and may select one device from a device list corresponding to the selected trigger condition. The second server 220 may select at least one filter item from a filter item list corresponding to the selected trigger condition and device to generate the workflow.

The second server 220 may acquire information for setting an action of the workflow with reference to the first server 210 in the same manner as described above.

Figure 7:
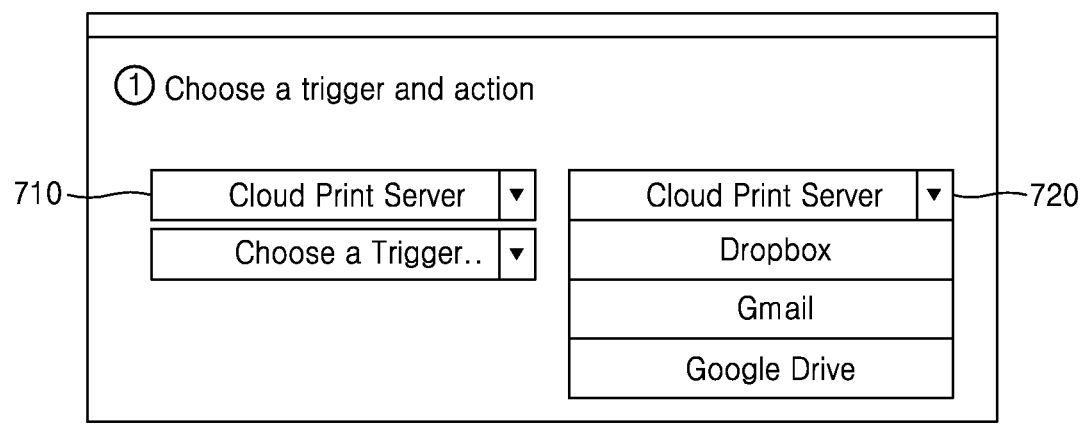
FIGS. 7 and 8 are diagrams of user interface screens for generating workflows in order to provide an automatic connection service in a cloud print server, according to an exemplary embodiment.
Figure 8:
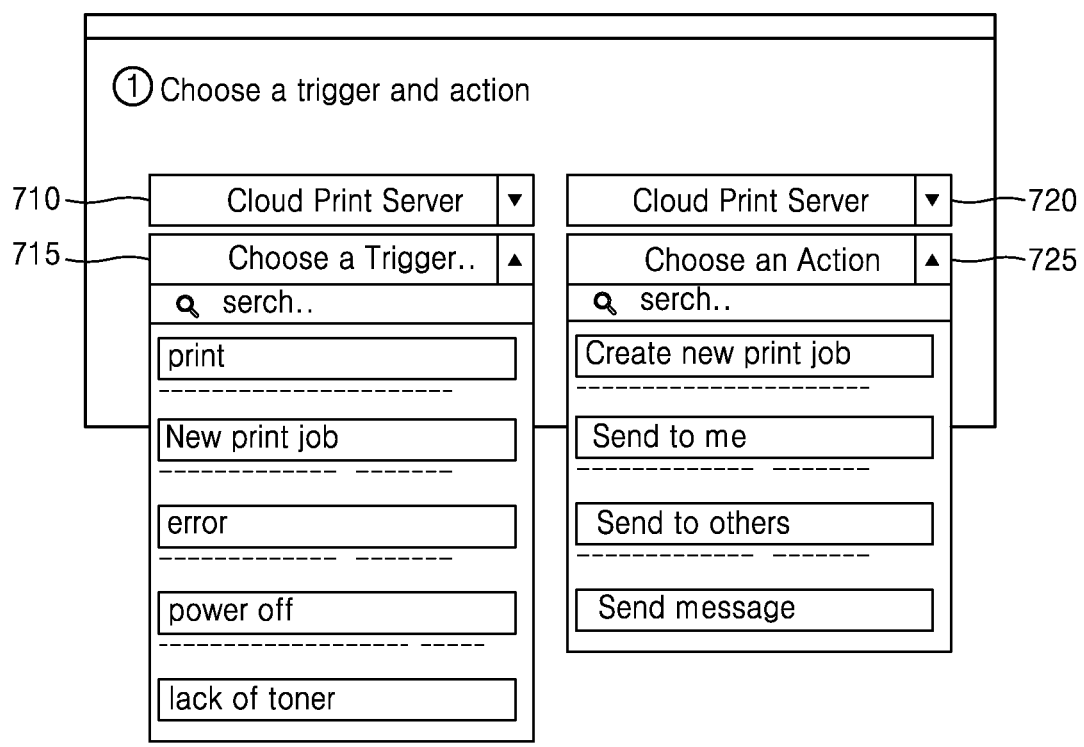

FIGS. 7 and 8 are diagrams of user interface screens for generating workflows in order to provide an automatic connection service in the cloud print server 200, according to an exemplary embodiment.

The cloud print server 200 may provide the automatic connection service by using a preset workflow. The workflow may be preset by a manager or a user. In a case where the user generates the workflow, the user may access the second sever 220 via a user device in order to generate the workflow. In more detail, the user may transmit a user input to the second server 220 via the user device and receive lists for selecting a trigger condition and an action from the second server 220 via the user device.

FIG. 7 illustrates the user interface screen for selecting the trigger condition and the action that are configured as a workflow.

The user may use a trigger service selection interface 710 and an action service selection interface 720 to select target services of the trigger condition and the action that are configured as the workflow. The user device may receive a trigger service list and an action service list from the second server 220 and may provide the trigger service list and the action service list to the user. In this regard, the second server 220 may transmit a request for the trigger service list and the action service list to the first server 210, may receive the trigger service list and the action service list from the first server 210, and may transfer the trigger service list and the action service list to the user device.

In more detail, the user device may provide a selectable trigger service list to the user via the trigger service selection interface 710, and the user may select one trigger service from the provided trigger service list.

A trigger service is a cloud service in which an event corresponding to the trigger condition occurs. For example, in a case where an event occurred in the cloud print server 220 is set as the trigger condition, the user may select the cloud print server 20 from the trigger service list. The user may select an external cloud server in addition to the cloud print server 200. For example, the external cloud server may include a cloud service server such as Dropbox, Gmail, Google Drive, Ever Note, etc. The external cloud server may include a social network service such as Instagram, etc. but is not limited thereto. The external cloud server may include cloud servers providing various services to the user.

The user device may provide a selectable action service list to the user via the action service selection interface 720. The user may select one action service from the provided action service list.

An action service is a cloud server in which an action is performed. For example, in a case where the action is performed in the cloud print server 200, the user may select the cloud print server 200 from the provided action service list. The user may select an external cloud server in addition to the cloud print server 200. For example, the external cloud server may include the cloud service server such as Dropbox, Gmail, Google Drive, Ever Note, etc. The external cloud server may include the social network service such as Instagram, etc. but is not limited thereto. The external cloud server may include cloud servers providing various services to the user.

Referring to FIG. 8, the user interface screen for selecting the trigger condition and the action that are configured as a workflow is illustrated.

The user may use a trigger selection interface 715 and an action selection interface 725 to select the trigger condition and the action that are configured as the workflow. The user device may receive an event list and an action list from the second server 220 and may provide the event list and the action list to the user. In this regard, the second server 220 may transmit a request for the event list and the action list to the first server 210, may receive the event list and the action list from the first server 210, and may transfer the event list and the action list to the user device.

In more detail, the user device may provide a selectable event list to the user via the trigger selection interface 715, and the user may select one event from the provided event list as the trigger condition.

The event list may include events that may occur in accordance with a selected trigger service. For example, in a case where the cloud print server 200 is selected via the trigger service selection interface 710, the second server 220 may receive an event list corresponding to the cloud print server 200 from the first server 210 and provide the event list to the user via the user device. For example, in a case where the cloud print server 200 is selected via the trigger service selection interface 710, the event list may include events such as "finish print", "receive new print job", "error occurred", "power off", "lack of toner", etc.

Alternatively, in a case where an external cloud server is selected via the trigger service selection interface 710, the second server 220 may request the selected external cloud server to send the event list, may receive the event list corresponding to the external cloud server from the selected external cloud server, and provide the received event list to the user via the user device. For example, in a case where a cloud server providing an email service such as a cloud server Gmail is selected via the trigger service selection interface 710, the event list may include events such as receive email, send email, log in email account, etc. In a case where a cloud server providing a storage service such as a cloud server Dropbox is selected via the trigger service selection interface 710, the event list may include events such as receive file, delete email, move file, etc. However, the exemplary embodiments are not limited thereto. An event list including various events according to various services provided by a selected cloud server may be provided.

The user device may provide a selectable action list to the user via the action selection interface 725. The user may select one action from the action list.

The action list may include actions that may be performed in accordance with a selected action service. For example, in a case where the cloud print server 200 is selected via the action service selection interface 720, the second server 220 may receive an action list corresponding to the cloud print server 200 from the first server 210 and may provide the action list to the user via the user device. For example, in a case where the cloud print server 200 is selected via the action service selection interface 720, the action list may include actions such as "create new print job", "send me the print job" and "send the print job to other", "send message", etc.

Alternatively, in a case where an external cloud server is selected via the action service selection interface 720, the second server 220 may request the selected external cloud server to send the action list, may receive the action list corresponding to the selected external cloud server from the selected external cloud server, and provide the action list to the user via the user device. For example, in a case where an external cloud server is selected via the action service selection interface 720, the action list may include actions such as send email, store cloud account, upload, etc. according to various services provided by the selected external cloud server.

The user may select one event from the event list via the user device as the trigger condition and may select one action from a job list as an action that is to be performed. The second server 220 may receive the selected trigger condition and action from a user device to store the workflow.

Figure 9:
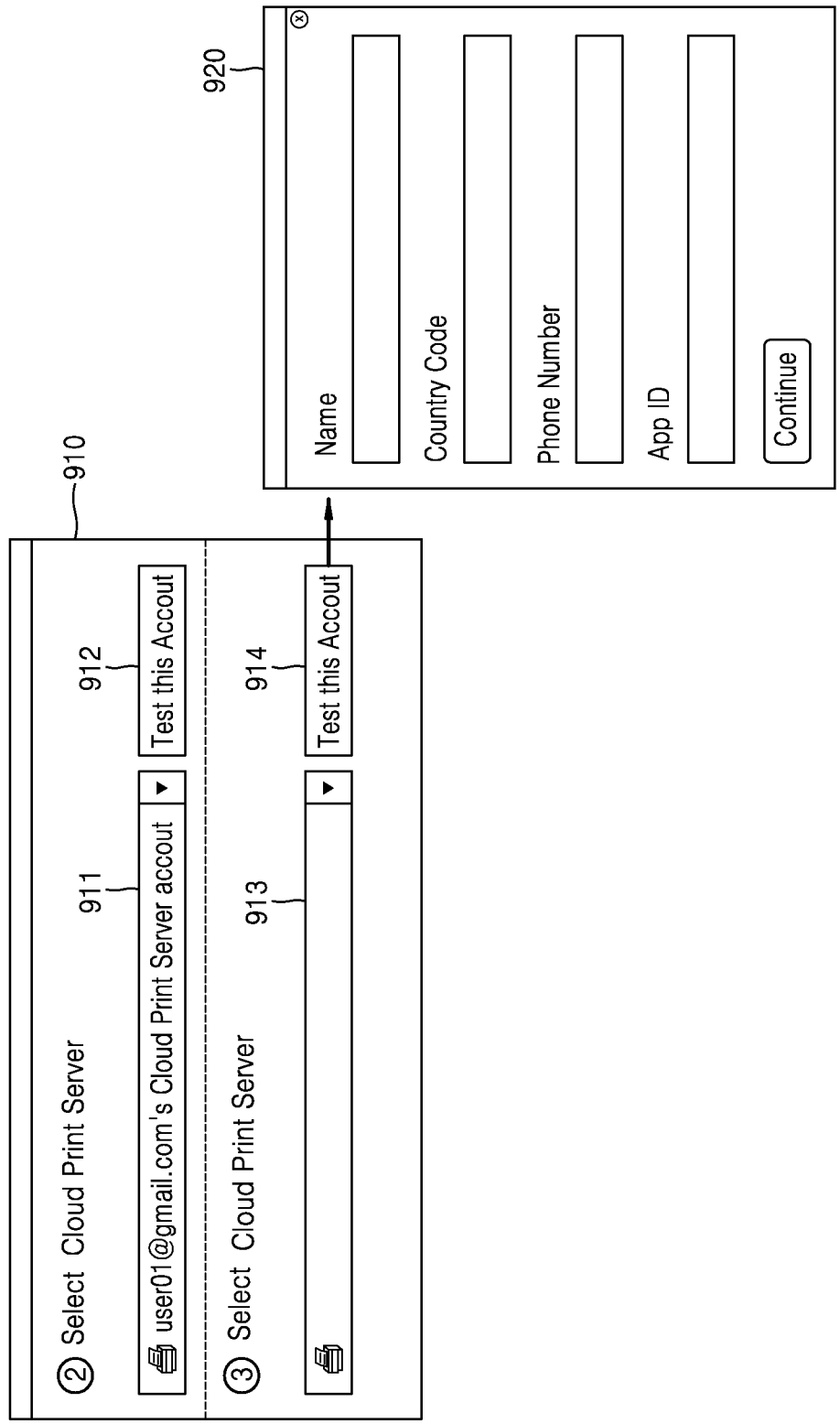
FIG. 9 is a diagram of a user interface screen for registering a user account in order to use an automatic connection service, according to an exemplary embodiment.

FIG. 9 is a diagram of a user interface screen 910 for registering a user account in order to use an automatic connection service, according to an exemplary embodiment.

The cloud print server 200 may set an account with respect to the cloud print server 200 or an external cloud server in order to provide the automatic connection service.

Referring to FIG. 9, the user interface screen 910 for setting the account with respect to the cloud print server 200 or the external cloud server is illustrated.

In more detail, the second server 220 may receive user identification information with respect to a selected trigger service via a user device, and may set the account by using the received user identification information. The user identification information may be intrinsic information for identifying users and may include, for example, information such as phone numbers, registration IDs used in a system, email addresses, etc.

The second server 220 may perform authentication via the first server 210 in order to confirm whether the received user identification information is valid.

For example, in a case where the cloud print server 200 is selected as the trigger service, if a user presses an account registration interface 912 in order to perform authentication, a user interface screen 920 for setting the account may appear. The second server 220 may receive the user identification information such as a user email address, country information, a phone number, a user ID, etc. from the user via a user device, may transmit the received user identification information to the first server 210 of the cloud print server 200, and may request authentication.

The first server 210 may determine whether the user of the user identification information is a valid user by using the received user identification information and, if it is determined that the user is the valid user, may transmit a valid authentication result to the second server 220. If the second server 220 receives the valid authentication result, the second server 220 may register the user account as a valid account. The user may select the registered account via an account setting interface 911 and may set the account.

The second server 220 may set an account with respect to an action service by using an account setting interface 913 and an account registration interface 914 in the same method as the method of setting the account with respect to the trigger service.

Figure 11:
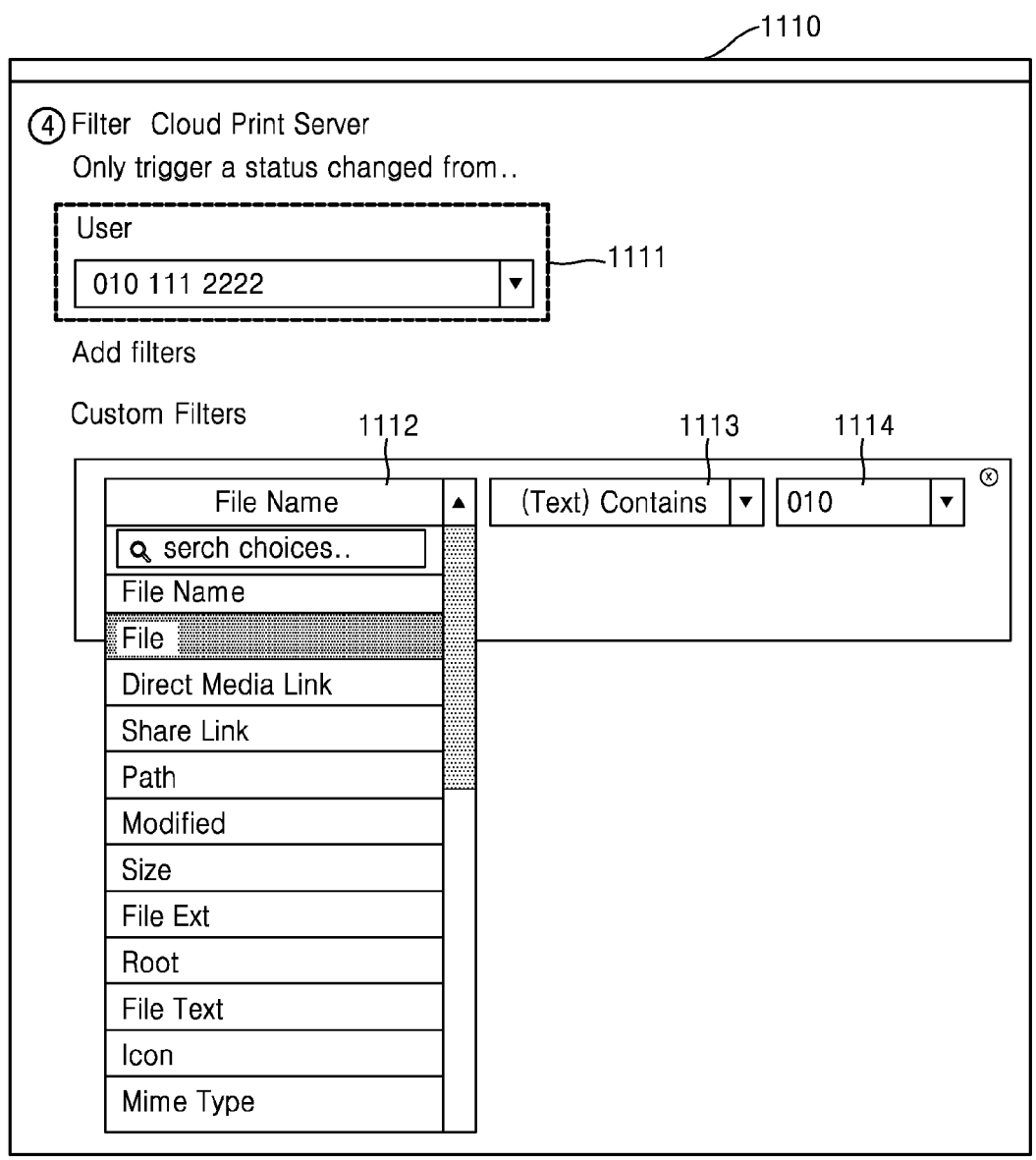

FIGS. 10 and 11 are diagrams of user interface screens 1010 and 1110, respectively, for setting filter items of an automatic connection service provided by the cloud print server 200, according to an exemplary embodiment.

A filter item with respect to a trigger condition is used to set the trigger condition in detail and may be set by overlapping a plurality of filter items with respect to one trigger condition.

Referring to FIG. 10, in the automatic connection service provided by using device state information such as an image forming apparatus, etc., the user interface screen 1010 for setting filter items is illustrated. The user interface screen 1010 may include a device selection interface 1011 for receiving a user input to select a device.

In a case where the cloud print server 200 provides the automatic connection service by using the device state information such the image forming apparatus, the second server 220 may generate a workflow by using the device state information. The second server 220 may receive the device state information from a user via the device selection interface 1011 displayed on a user device.

For example, if an error occurrence "error" is selected via the trigger selection interface 715 of FIG. 8, and a device "33F_Printer1" is selected via the device selection interface 1011, the second server 220 may set an event in which an error occurs in the device "33F_Printer1" as a trigger condition.

The second server 220 may receive a filter item list from the first server 210 and provide the received filter item list to the user via the user device. The user interface screen 1010 may further include a first filter interface 1012, a second filter interface 1013, and a third filter interface 1014 for setting filter items.

For example, in a case where the error occurrence "error" is selected via the trigger selection interface 715 of FIG. 8, and the device "33F_Printer1" is selected via the device selection interface 1011, the user may select an error log "error log" by using the first filter interface 1012. The first filter interface 1012 may display a first filter item list including the error log "error log". The user may select the error log "error log" from the first filter item list.

The user may specifically set a condition for operating the error log as a filter item by using the second filter interface 1013 and the third filter interface 1014. For example, if the user selects the "error log" via the first filter interface 1012, a case "contains" via the second filter interface 1013, and "paper jam" via the third filter interface 1014, the second server 220 may set an event in which an error (paper jam) occurs in the device "33F_Printer1" as the trigger condition.

The first filter item list may include, in addition to the "error log", filter items regarding the device state information such as "lack of consumable", "power on/off", etc. The first filter item list may also include filter items regarding job state information such as a "print job owner", a "print count", etc.

The second server 220 may display a second filter item list via the filter interface 1013 and a third filter item list via the third filter interface 1014. The user may set the filter items by using the filter interface 1013 and the third filter interface 1014.

Referring to FIG. 11, the user interface screen 1110 for setting filter items in the automatic connection service provided by using job state information acquired from the cloud print server 200 or an external cloud server is illustrated. For example, in a case where the user selects receive "new print job" from the trigger selection interface 715 of FIG. 8, the cloud print server 200 may set an event sharing a new job with an account of the user user1 as a trigger condition. The cloud print server 200 may set all events sharing the new job as the trigger condition or may set some of events sharing the new job by adding a detailed condition as the trigger condition.

For example, the user interface screen 1110 may include a user interface 1111 for setting the user user1 with respect to an account sharing the new job. Alternatively, the user user1 may input identification information of another user user 2 via the user interface 1111 to set an account of the user user 2 as the account sharing the new job. The second server 220 may set an event sharing the new job with an account corresponding to the input user identification information as the trigger condition.

The user interface screen 1110 may further include a first filter interface 1112, a second filter interface 1113, and a third filter interface 1114 for setting a detailed condition to determine whether the trigger condition is satisfied.

For example, in a case where the user selects a "file name" via the first filter interface 1112, the case "contains" via the second filter interface 1113, and 010 "010" via the third filter interface 1114, the second server 220 may set an event sharing a new job including "010" in the file name with a user account of a cloud server as the trigger condition.

Figure 12:
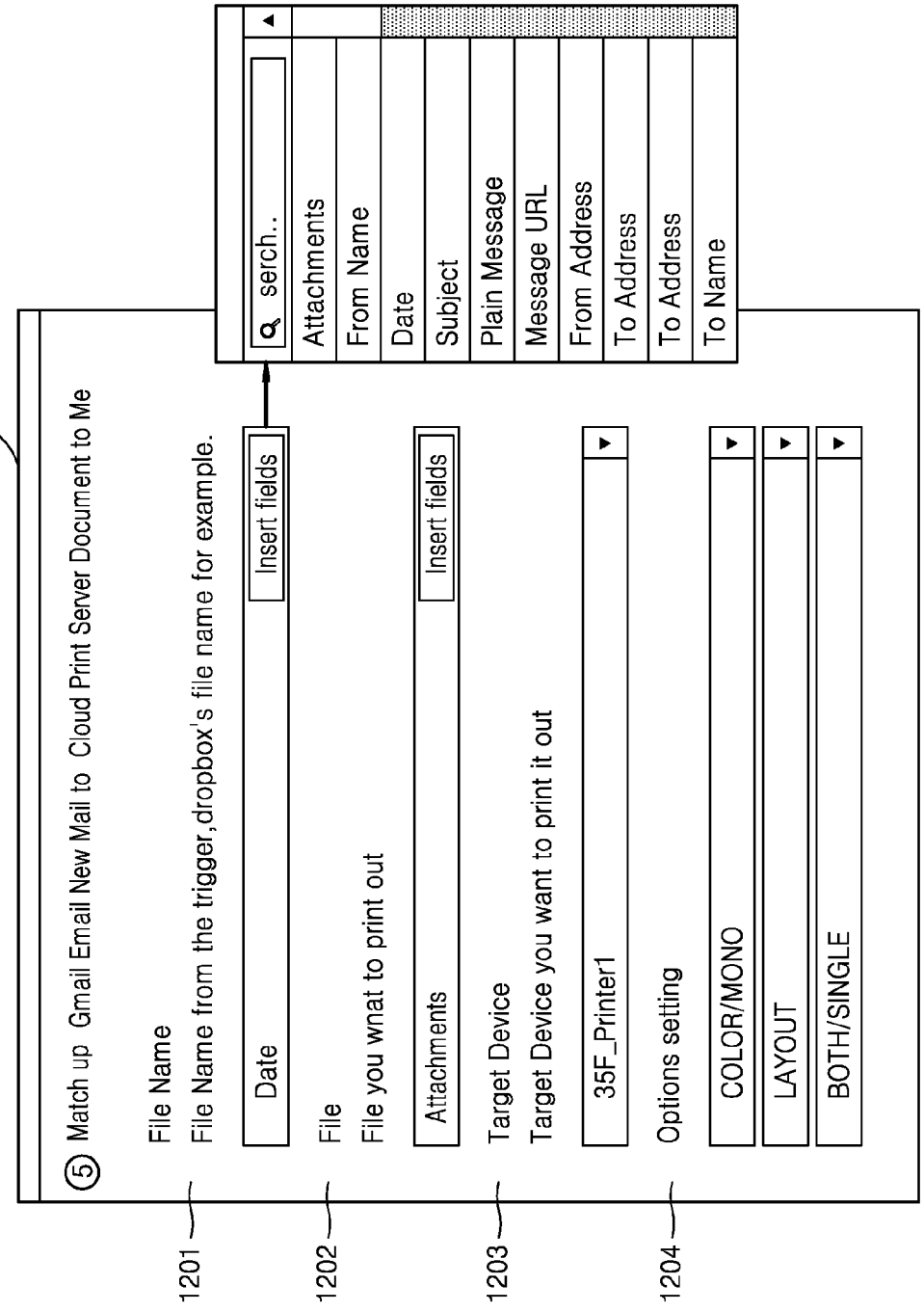
FIGS. 12 through 14 are diagrams of user interface screens for setting details of an action of an automatic connection service provided by a cloud print server, according to an exemplary embodiment.
Figure 13:
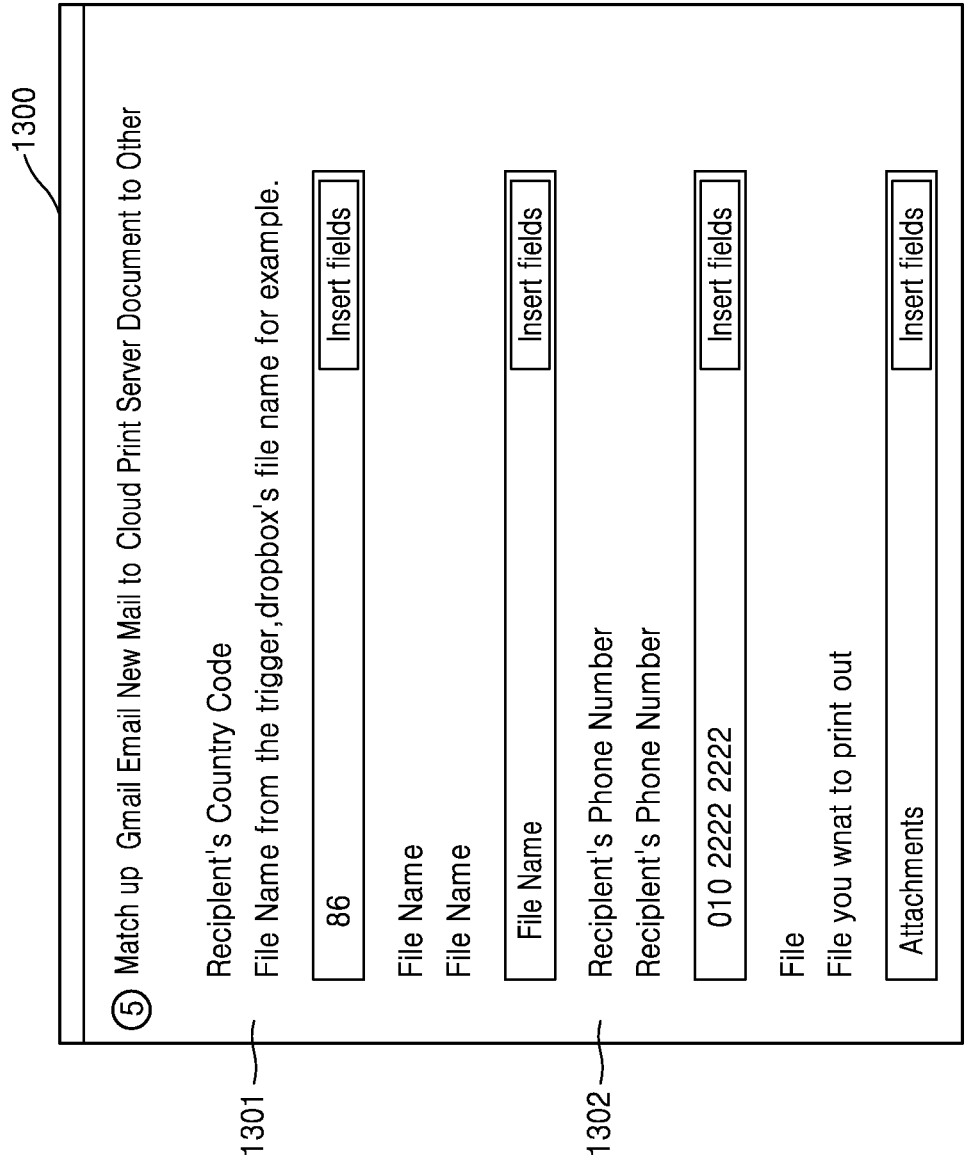
Figure 14:
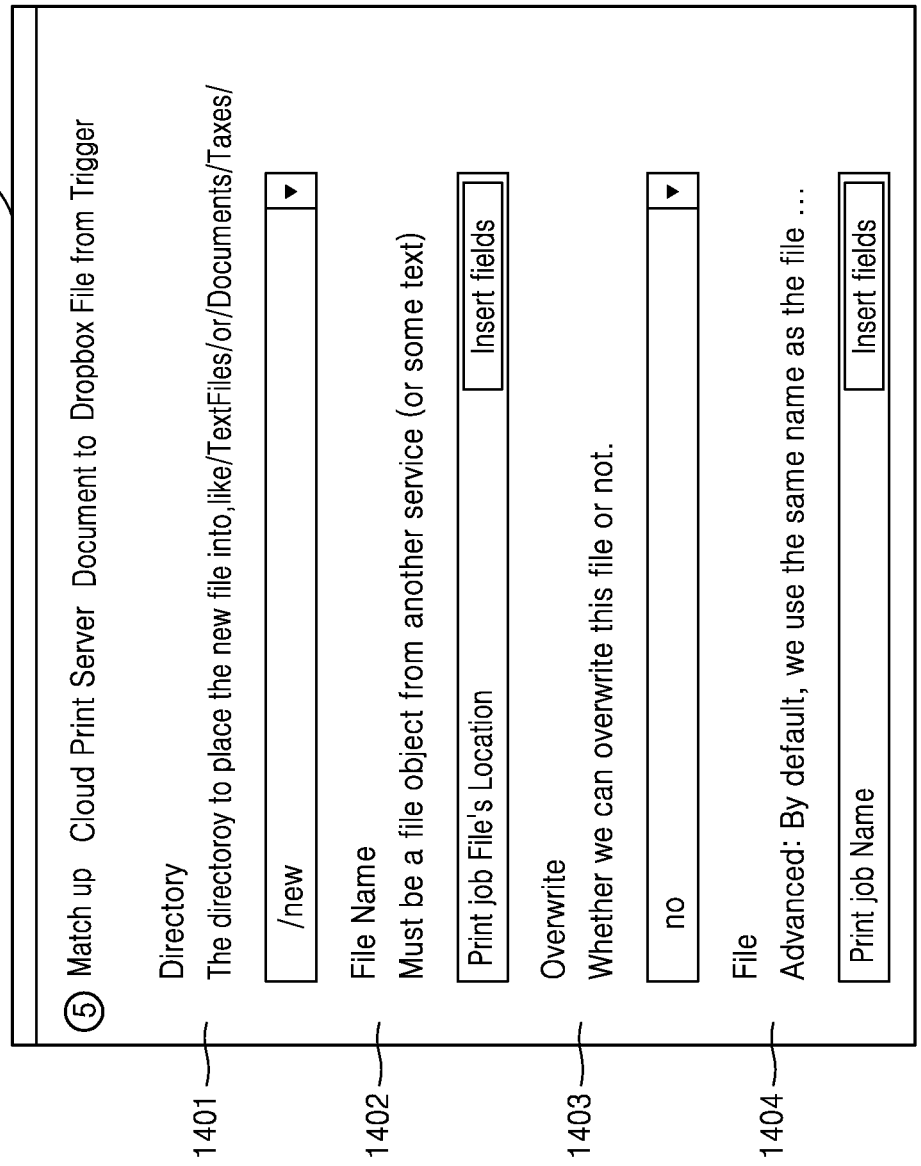

FIGS. 12 through 14 are diagrams of user interface screens 1200, 1300, and 1400 for setting details of an action of an automatic connection service provided by the cloud print server 200, according to an exemplary embodiment.

FIG. 12 illustrates the user interface screen 1200 for setting details of an action of transmitting a new print job to an account of the user user1 of the cloud print server 200 if a new email is received in the account of the user user1 of a Gmail cloud server that is an external cloud server in order to provide the automatic connection service performing the action.

The exemplary embodiment of FIG. 12 shows a case in which the Gmail cloud server is selected as a trigger service but the exemplary embodiment is not limited thereto. The exemplary embodiment may include cases where various external cloud servers providing an email service are selected and may also include cases where various external cloud servers providing other various services are selected.

The user interface screen 1200 for setting the details of the action may include a user interface such as a file name setting interface 1201, a file setting interface 1202, an image forming apparatus setting interface 1203, an option setting interface 1204, etc.

A user may preset a name of a file generated by performing the action via the file name setting interface 1201 and the file setting interface 1202. The user may set the file name by using information received from a trigger service selected in FIG. 7. For example, in a case where the Gmail cloud server is selected as the trigger service in FIG, information that may be received from the Gmail cloud server may include a "file name", "attachments", a "sender name", a "date", a title "subject", etc.

For example, the user may set the file name of the new print job that is to be transmitted to the account of the user of the cloud print server 200 by using the file name setting interface 1201. In a case where the "Date" is selected via the file name setting interface 1201, the second server 220 may set, as the action, the new print job with the file name of date "14/11/15" when a new email is received to an account of a Gmail user.

In more detail, if the second server 220 determines that a trigger condition of a workflow is satisfied, the second server 220 may receive date information from the Gmail cloud server and transmit the date information to the first server 210. The first server 210 may use the received date information to store the new print job with the file name "14/11/15" in the account of the user.

The user may set a target of the new print job that is to be transmitted to the account of the user of the cloud print server 200 by using the file setting interface 1202. For example, in a case where the "Attachments" are selected via the file setting interface 1202, the second server 220 may set, as the action, the new print job having an attachment of the new email received in the account of the Gmail user as a print job target.

If the second server 220 determines that the trigger condition of the workflow is satisfied, the second server 220 may receive the attachment from the Gmail cloud server and transmit the attachment to the first server 210 of the cloud print server 200. The first server 210 may store the new print job having the received attachment as a print job in the account of the user.

The user may also set an image forming apparatus that is to print the new print job set as the action by using the image forming apparatus setting interface 1203. For example, the user may input identification information of the image forming apparatus via the image forming apparatus setting interface 1203 to select the image forming apparatus that is to print the new print job. The second server 220 may provide an image forming apparatus list corresponding to user identification information via the image forming apparatus setting interface 1203. The user may select one image forming apparatus that is to pint the new print job from the image forming apparatus list.

In more detail, the second server 220 may use the user identification information received from the user to receive the image forming apparatus list corresponding to the user identification information with reference to the first server 210 and provide the image forming apparatus list to the user via a user device.

The user may set detailed options of the new print job set as the action via the option setting interface 1204. For example, the detailed options of the new print job may include color/mono printing, a layout, both/single sided printing, etc.

In more detail, the second server 220 may use the identification information of the image forming apparatus selected by the user to acquire capability information of the image forming apparatus with reference to the first server 210. The second server 220 may provide settable options to the user by using the acquired capability information. The user may set the detailed options of the new print job based on the provided options.

The second server 220 may provide options that are settable by the user by using the user identification information acquired from the user. For example, the first server 210 may store information regarding printing authority set in accordance with the user. The printing authority is setting authority with respect to options of a print job and may include, for example, a limited printing sheet, a limited printing number, a limited color printing, etc. The second server 220 may transmit the user identification information to the first server 210 to receive the information regarding printing authority corresponding to the user identification information from the first server 210 and provide settable options to the user by using the received information regarding printing authority.

FIG. 13 illustrates the user interface screen 1300 for setting details of an action of transmitting a new print job to an account of the other user user2 of the cloud print server 200 if a new email is received in an account of the user user1 of a Gmail cloud server that is an external cloud server in order to provide the automatic connection service performing the action.

The exemplary embodiment of FIG. 13 shows a case in which the Gmail cloud server is selected as a trigger service but is not limited thereto. The exemplary embodiment may include cases where various external cloud servers providing an email service are selected and may also include cases where various external cloud servers providing other various services are selected.

The user interface screen 1300 for setting the details of the action may include a user interface such as a file name setting interface, recipient setting interfaces 1301 and 1302, a file setting interface, etc.

A process of setting a file name and a file via the file name setting interface and the file setting interface may be the same as described with reference to FIG. 12 above.

A user may preset another user who is to receive the new print job via the recipient setting interfaces 1301 and 1302. For example, the user may input a phone number of the other user who is to receive the new print job via the recipient setting interfaces 1301 and 1302. The second server 220 may acquire identification information of the other user such as a phone number from the user to transmit the new print job to an account of the cloud print server 200 of the other user.

FIG. 14 illustrates the user interface screen 1400 for setting details of an action of storing a new file in an account of a user of a Dropbox cloud server that is an external cloud server if a new print job is received in an account of a user of the cloud print server 200 in order to provide the automatic connection service performing the action.

The exemplary embodiment of FIG. 14 shows a case in which the Dropbox cloud server is selected as an action service but is not limited thereto. The exemplary embodiment may include cases where various external cloud servers providing a storage service are selected and may also include cases where various external cloud servers providing other various services are selected.

The user interface screen 1400 for setting the details of the action may include a user interface such as a folder name setting interface 1401, a file setting interface 1402, an overwrite setting interface 1403, a file name setting interface 1404, etc.

A user may set a folder that is to store a new file in the account of the user of the Dropbox cloud server via the folder name setting interface 1401. For example, in a case where the folder name setting interface 1401 is set as "new", the new file may be stored in a folder "new" of the account of the user of the Dropbox cloud server.

If a trigger condition of a workflow is satisfied, the second server 220 the second server 220 may transmit the new file to the folder "new" of the account of the user of the Dropbox cloud server.

The user may set a file and a file name that are to be transmitted via the file setting interface 1402 and the file name setting interface 1404. The user may set the file and the file name that are to be transmitted by using information received from a trigger service selected in FIG. 7. For example, in a case where the selected trigger service is the cloud print server 200, the information may be received from the first server 210 of the cloud print server 200. The information received from the first server 210 may include a "print job file's location", a "print job name", a "print job user", etc.

In more detail, the user may set a file that is to be stored in the account of the user of the Dropbox cloud server via the file setting interface 1402. For example, in a case where the "print job file's location" is selected via the file setting interface 1402, the second server 220 may set, as the action, a job of storing the new file having the print job file location in the cloud print server 200 as content in the account of the user of the Dropbox cloud server.

If the trigger condition of the workflow is satisfied, the second server 220 may receive the print job file location in the cloud print server 200 from the first server 210 and may transmit the new file having the received print job file location as content to the account of the user of the Dropbox cloud server.

The user may set a name of a file that is to be stored in the account of the user of the Dropbox cloud server via the file name setting interface 1404. For example, in a case where the "print job name" is selected via the file name setting interface 1404, the user may set, as the action, a job of storing the new file having the print job name as a file name in the account of the user of the Dropbox cloud server.

If the trigger condition of the workflow is satisfied, the second server 220 may receive the print job name from the first server 210 and may transmit the new file having the received print job name as the file name to the account of the user of the Dropbox cloud server.

Figure 15:
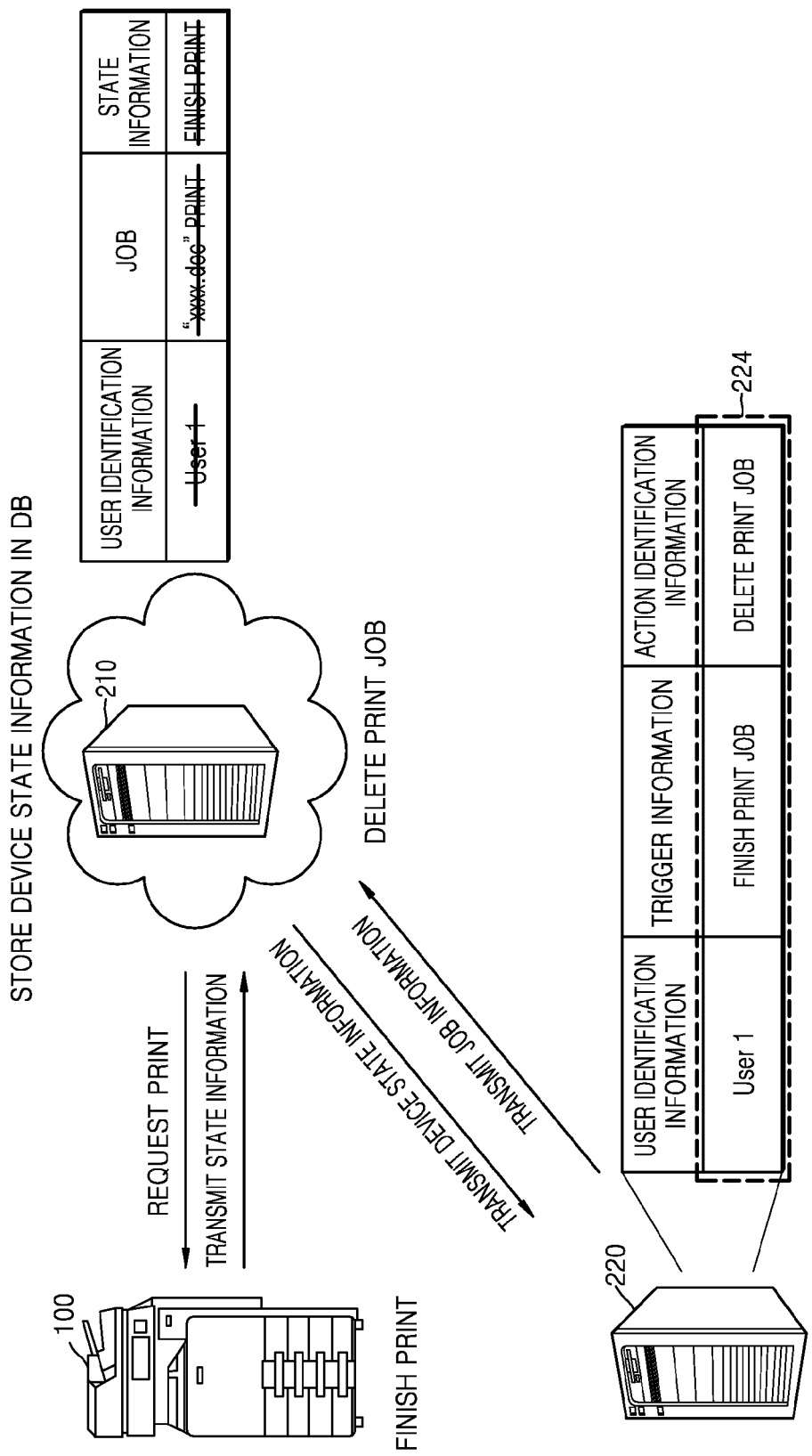
FIG. 15 is a diagram for describing an automatic connection service provided by a cloud print server, according to another exemplary embodiment.

FIG. 15 is a diagram for describing an automatic connection service provided by the cloud print server 200, according to another exemplary embodiment.

FIG. 15 shows a process of providing the automatic connection service in a case where job state information of a job that is being performed by the image forming apparatus 100 is changed. For example, if the job that is being performed by the image forming apparatus 100 is finished, the cloud print server 200 may delete the finished job.

In more detail, the image forming apparatus 100 finishes a print job, the image forming apparatus 100 may transmit job state information of the print job to the first server 210.

For example, the image forming apparatus 100 may receive a print request for a print job "xxx.doc" from the first server 210, and, when the print job "xxx.doc" is finished, may transmit "finish print job" that is job state information of the print job "xxx.doc" to the first server 210.

The first server 210 may receive and store the job state information "finish print job". The first server 210 may also store user identification information corresponding to the print job "xxx.doc". The job state information "finish print job" may further include detailed information such as a file name indicating detailed information of the print job "xxx.doc", a print date, etc.

The second server 220 may transmit a request for the job state information to the first server 210 to receive the job state information from the first server 210.

Referring to FIG. 15, the second server 220 may store a preset workflow 224.

The second server 220 may determine whether the received job state information "finish print job" satisfies a trigger condition with reference to the workflow 204 found in accordance with the user identification information. Since the trigger condition of the workflow 204 is satisfied, the second server 220 may control to perform an action "delete print job" corresponding to the trigger condition.

The second server 220 may transmit action identification information of the workflow 224 to the first server 210 to control to perform the action of the workflow 224.

The first server 210 may perform the action of deleting the print finished job and data of the print finished job by using the received action identification information.

Figure 16:
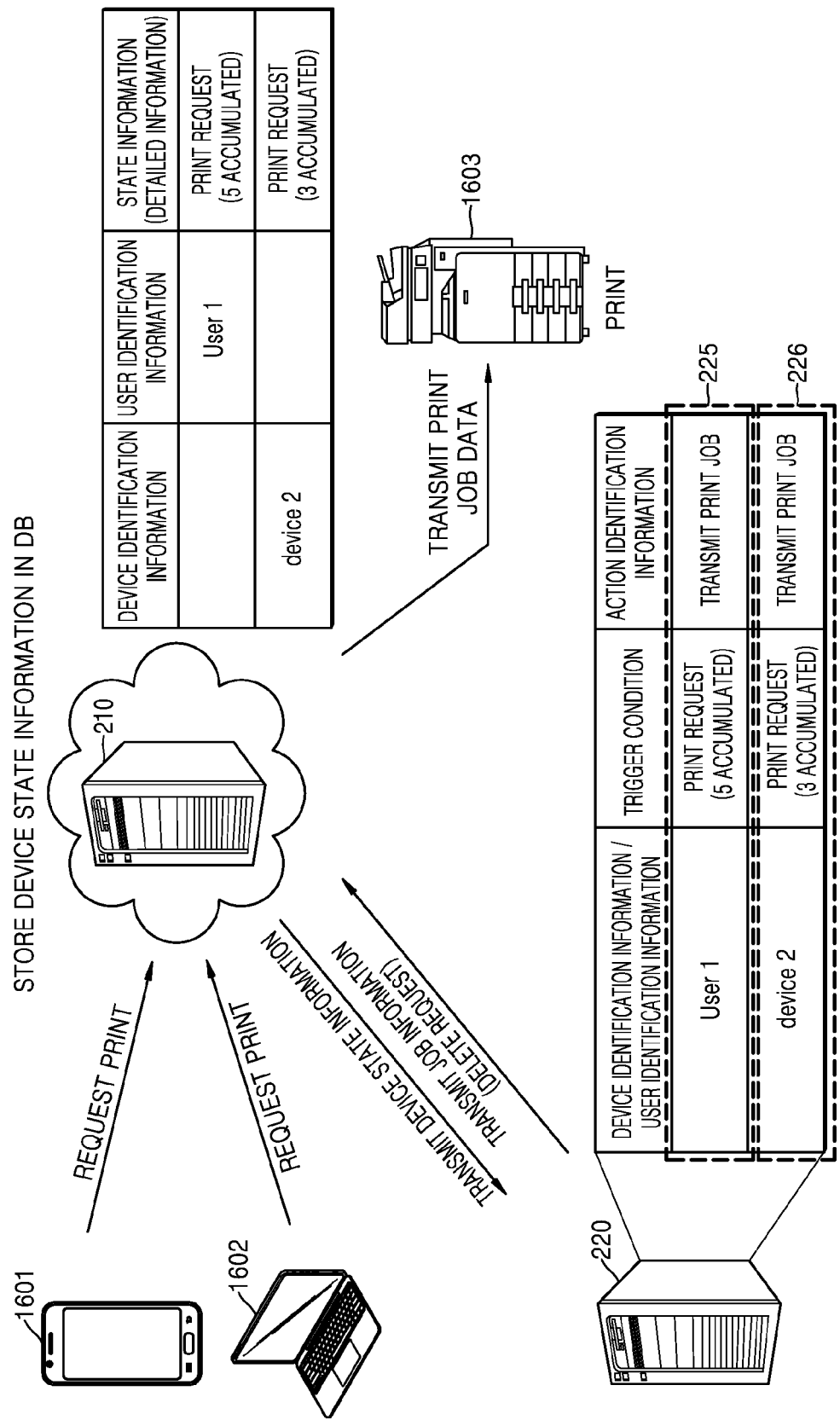
FIG. 16 is a diagram for describing an automatic connection service provided by a cloud print server, according to another exemplary embodiment.

FIG. 16 is a diagram for describing an automatic connection service provided by the cloud print server 200, according to another exemplary embodiment.

FIG. 16 shows a process of providing the automatic connection service in a case where device state information of the image forming apparatus 100 or job state information of a job that is being performed by the image forming apparatus 100 is changed. For example, if more print requests than a certain number of times are accumulated, the cloud print server 200 may generate a print job.

The first server 210 may receive a print request from a user device, such as a mobile terminal 1601, a PC 1602, etc. In this regard, the first server 210 may store the print job without immediately transmitting the print job. The first server 210 may store a print request accumulation number in accordance with identification information of a user who transmits the print request. The first server 210 may store the print request accumulation number in accordance with identification information of a device such as an image forming apparatus that is to perform a print job in response to the print request.

In this regard, a "print request (5 requests accumulated)" stored in accordance with the user identification information may be job state information with respect to the user, and a "print request (3 requests accumulated)" stored in accordance with the device identification information may be the device identification information.

The second server 220 may transmit a request for state information to the first server 210 and receive the job state information or the device state information from the first server 210.

Referring to FIG. 16, the second server 220 may store preset workflows 225 and 226.

The second server 220 may determine whether the received job state information "print request (5 requests accumulated)" satisfies a trigger condition with reference to a workflow found in accordance with the device identification information or the user identification information. If the trigger condition is satisfied, the second server 220 may control to perform an action corresponding to the trigger condition with reference to the workflow.

The workflow 225 may be referred to by the second server 220 in order to transmit a new print job to a user account of the cloud print server 200 and accumulate print jobs if more than 5 print requests are received and accumulated in the user account of the cloud print server 200.

The workflow 226 may be referred to by the second server 220 in order to transmit a new print job to a device managed by the cloud print server 200 and accumulated print jobs if more than 3 print requests are received and accumulated in the device.

If the job state information "print request (5 requests accumulated)" corresponding to user identification information user1 is received, the second server 220 may determine that a trigger condition of the workflow 225 is satisfied and control to perform an action "transmit print job" corresponding to the trigger condition.

If the device state information "print request (3 requests accumulated)" is received, the second server 220 may determine that a trigger condition of the workflow 226 is satisfied and control to perform the action "transmit print job" corresponding to the trigger condition.

The second server 220 may transmit action identification information of the workflow 225 to the first server 210 in order to control to perform the action of the workflow 225.

The first server 210 may use the received action identification information of the workflow 225 to transmit a print job and a print request to an account of the user user1 of the cloud print server 200.

The second server 220 may transmit action identification information of the workflow 226 to the first server 210 in order to control to perform the action of the workflow 226.

The first server 210 may use the received action identification information of the workflow 226 to transmit the print job and the print request to a device device2 1603.

Figure 17:
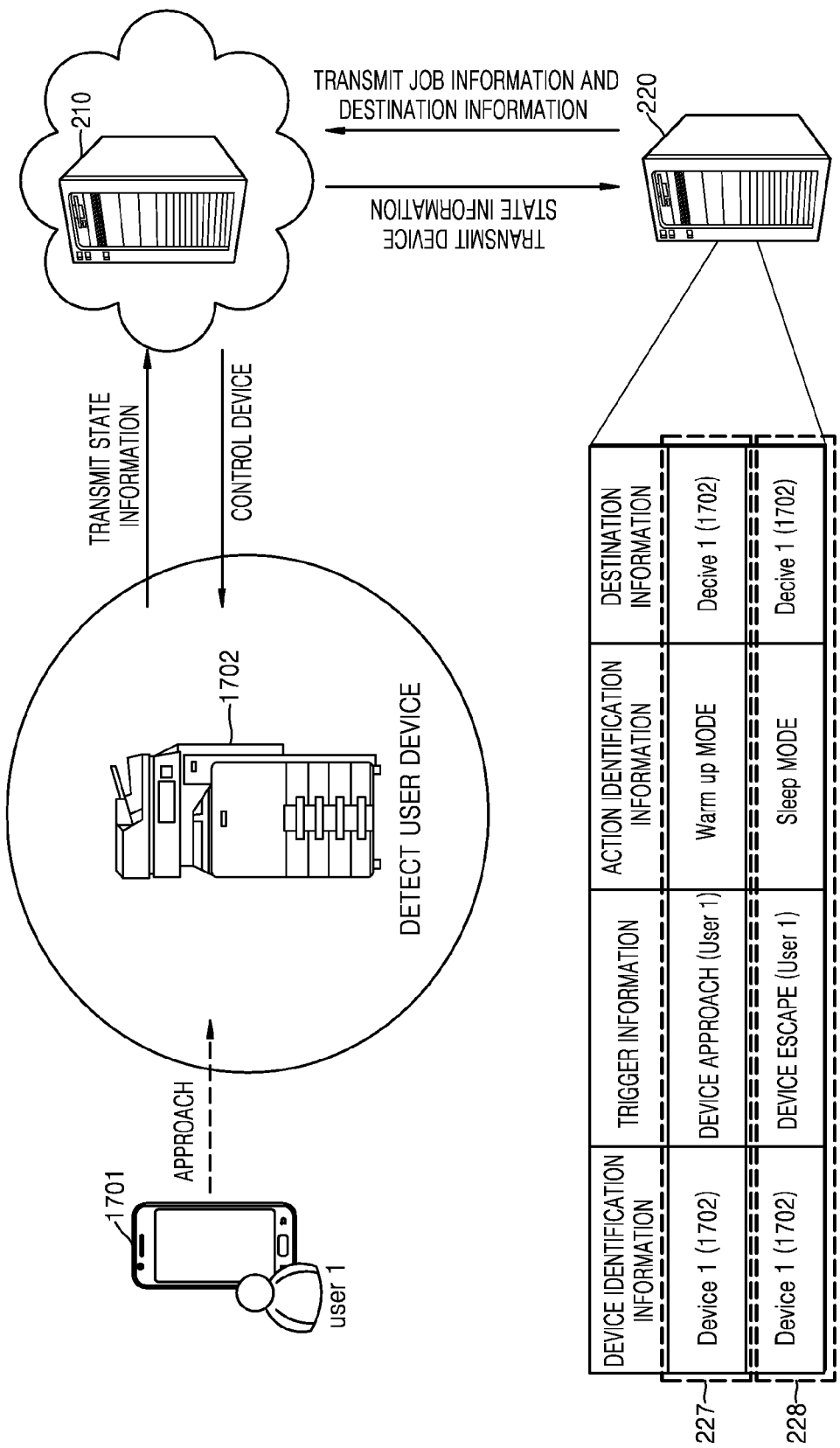
FIG. 17 is a diagram for describing an automatic connection service provided by a cloud print server, according to another exemplary embodiment.

FIG. 17 is a diagram for describing an automatic connection service provided by the cloud print server 200, according to another exemplary embodiment.

Referring to FIG. 17, in a case where a user device such as a mobile terminal 1701 approaches an image forming apparatus 1702, the cloud print server 200 may transmit a control signal to the image forming apparatus 1702. For example, the cloud print server 200 may transmit the control signal such as power on/off signal, a mode change signal, a job request signal, etc. to the image forming apparatus 1702.

In a case where a user device such as the mobile terminal 1701 approaches the image forming apparatus 1702, the cloud print server 200 may transmit a notification message information an approach of the mobile terminal 1701 and a location of the image forming apparatus 1702 to the mobile terminal 1701 or another user device.

In more detail, in a case where the image forming apparatus 1702 receives an approach signal from the mobile terminal 1701 through short distance wireless communication such as Bluetooth low energy (BLE), etc., the image forming apparatus 1702 may transmit device state information thereof to the first server 210. For example, the device state information of the image forming apparatus 1702 may include state information such as "device approaching" or "device moving off", etc.

Whenever the device state information of the image forming apparatus 1702 is changed, the image forming apparatus 1702 may transmit the changed device state information of the image forming apparatus 1702 to the first server 210.

The first server 210 that receives the device state information "device approaching" of the image forming apparatus 1702 from the image forming apparatus 1702 may map and store the received device state information and device identification information.

The second server 220 may periodically transmit the device state information of the image forming apparatus 1702 to the first server 210 and may receive the device state information "device approaching" of the image forming apparatus 1702 from the first server 210.

The second server 220 may search for a workflow corresponding to the device identification information or user identification information among stored workflows and may determine whether the received device state information device approaching" of the image forming apparatus 1702 satisfies a trigger condition with reference to a found workflow. If the trigger condition is satisfied, the second server 220 may control to perform an action corresponding to the trigger condition with reference to the workflow.

Referring to FIG. 17, the second server 220 may store preset workflows 227 and 228.

Since a trigger condition of the found workflow 227 is satisfied, the second server 220 may control an action of "changing a mode to a warm-up mode" corresponding to the trigger condition.

The second server 220 may transmit action identification information and destination information of the workflow 227 to the first server 210 in order to control to perform the action of the workflow 227.

The first server 210 may transmit a signal for changing a mode to an operating mode to the image forming apparatus by using the received action identification information and destination information.

Figure 18A:
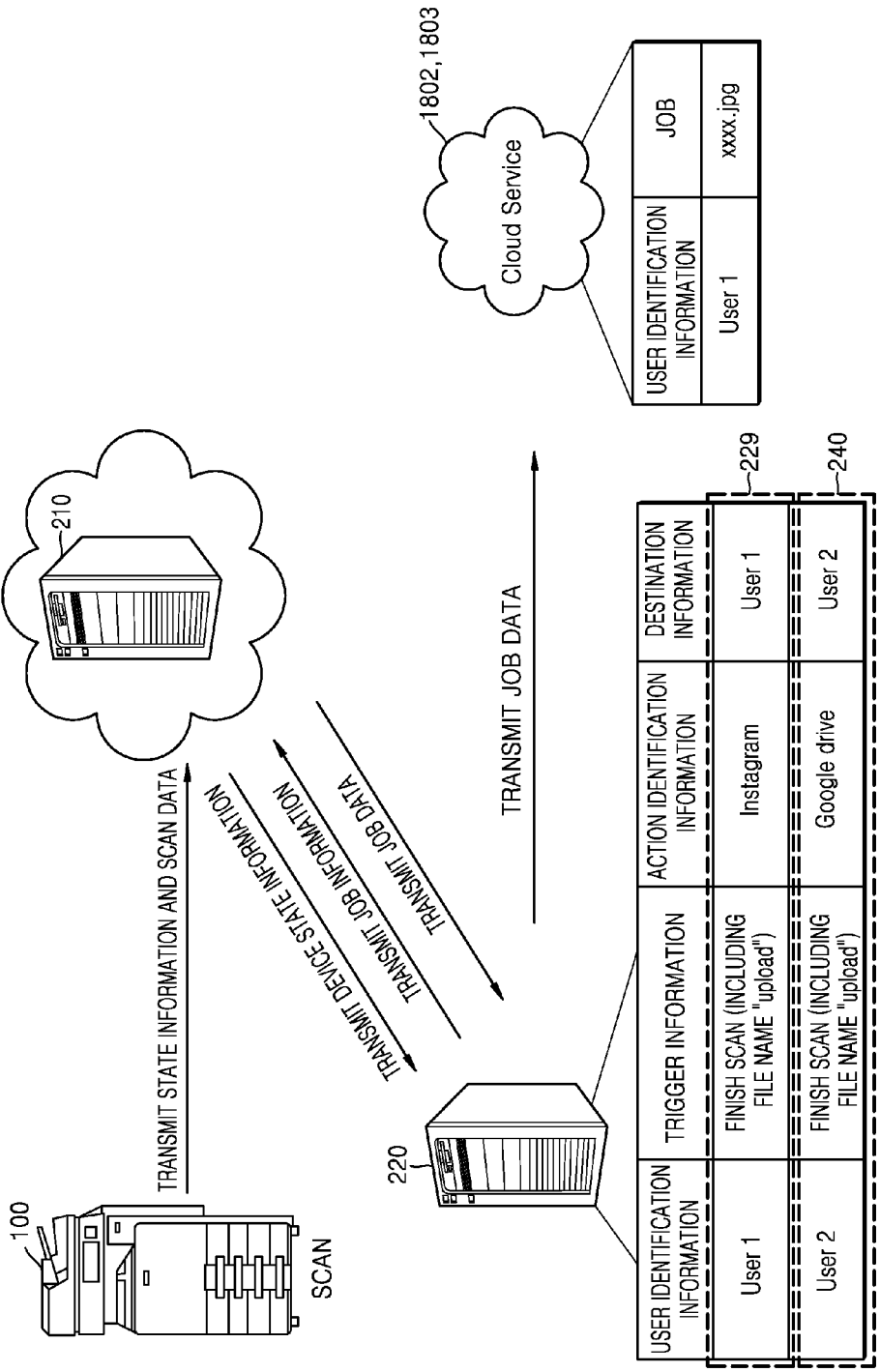
FIGS. 18A and 18B are diagrams for describing an automatic connection service provided by a cloud print server, according to another exemplary embodiment.
Figure 18B:
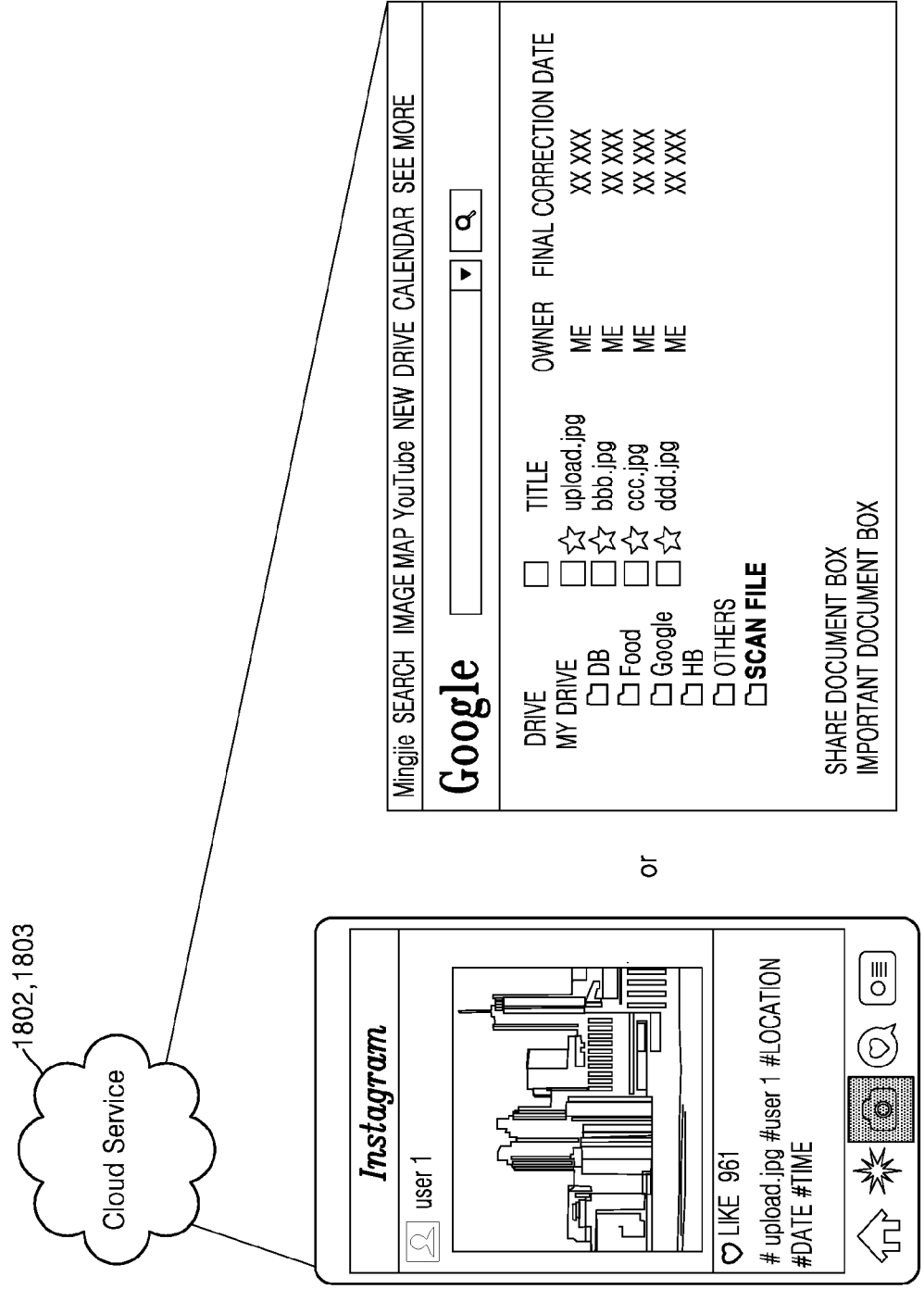

FIGS. 18A and 18B are diagrams for describing an automatic connection service provided by the cloud print server 200, according to another exemplary embodiment.

FIG. 18A shows a process in which the cloud print server 200 provides the automatic connection service by using job state information regarding a scan job if an image forming apparatus 1801 finishes scanning. For example, if the image forming apparatus 1801 finishes scanning, the cloud print server 200 may post a scan image to a user account of an Instagram SNS server 1802 that is an external cloud server and may store the scan image in a user account of a Google Drive cloud server 1803 that is an external cloud server. The cloud server performing an action is not limited thereto and may include external cloud servers providing various services.

In more detail, in a case where the image forming apparatus 1801 finishes scanning, the image forming apparatus 1801 may transmit the job state information regarding the scan job to the first server 210. For example, the image forming apparatus 1801 may transmit the job state information "finish scan" to the first server 210. The job state information may further include detailed information such as a file name of a scan file, a file type, a file size, a scan date, etc.

The first server 210 may store the received job state information. For example, the first server 210 may store the job state information received from the image forming apparatus 1801 in accordance with user identification information regarding a user of the scan job. In FIG. 18A, the first server 210 may receive and store the job state information "finish scan" regarding the scan job requested by the user user1. The job state information may further include information "upload.jpg" of the file name of the scan file.

The second server 220 may periodically transmit a state information request to the first server 210 and may receive the job state information "finish scan (file name: upload.jpg)" from the first server 210.

Referring to FIG. 18A, the second server 220 may store preset workflows 229 and 240.

The second server 220 may determine whether the received job state information "finish scan (upload.jpg)" satisfies a trigger condition with reference to the found workflows 229 and 240 in accordance with the user identification information.

Since the file name of the scan file includes "upload", the second server 220 may determine that the received job state information satisfies the trigger condition of the workflow 229. Thus, the second server 220 may control to perform an action corresponding to the trigger condition.

The second server 220 may transmit action identification information and destination information of the workflow 229 and an action performing request to the external cloud servers 1802 and 1803.

The external cloud servers 1802 and 1803 that receive the action identification information, the destination information, and the scan file may perform actions corresponding to the action identification information.

Referring to FIG. 18B, if the trigger condition of the workflow 229 is satisfied, the second server 220 may transmit the action identification information and the destination information of the workflow 229, the scan file, and the action performing request to the SNS server 1802 that is the external cloud server performing the action of the workflow 229.

The SNS server 1802 may post the scan image "upload.jpg" scanned by the image forming apparatus 1801 to an account of the user user1 in the SNS server 1802 based on the received action identification information and destination information of the workflow 229.

If the trigger condition of the workflow 240 is satisfied, the second server 220 may transmit action identification information and destination information of the workflow 240, and the scan file to the cloud server 1803 that is the external cloud server performing an action of the workflow 240.

The cloud server 1803 may store the scan image "upload.jpg" scanned by the image forming apparatus 1801 to the account of the user user1 in the cloud server 1803 based on the received action identification information and destination information of the workflow 240.

Figure 19:
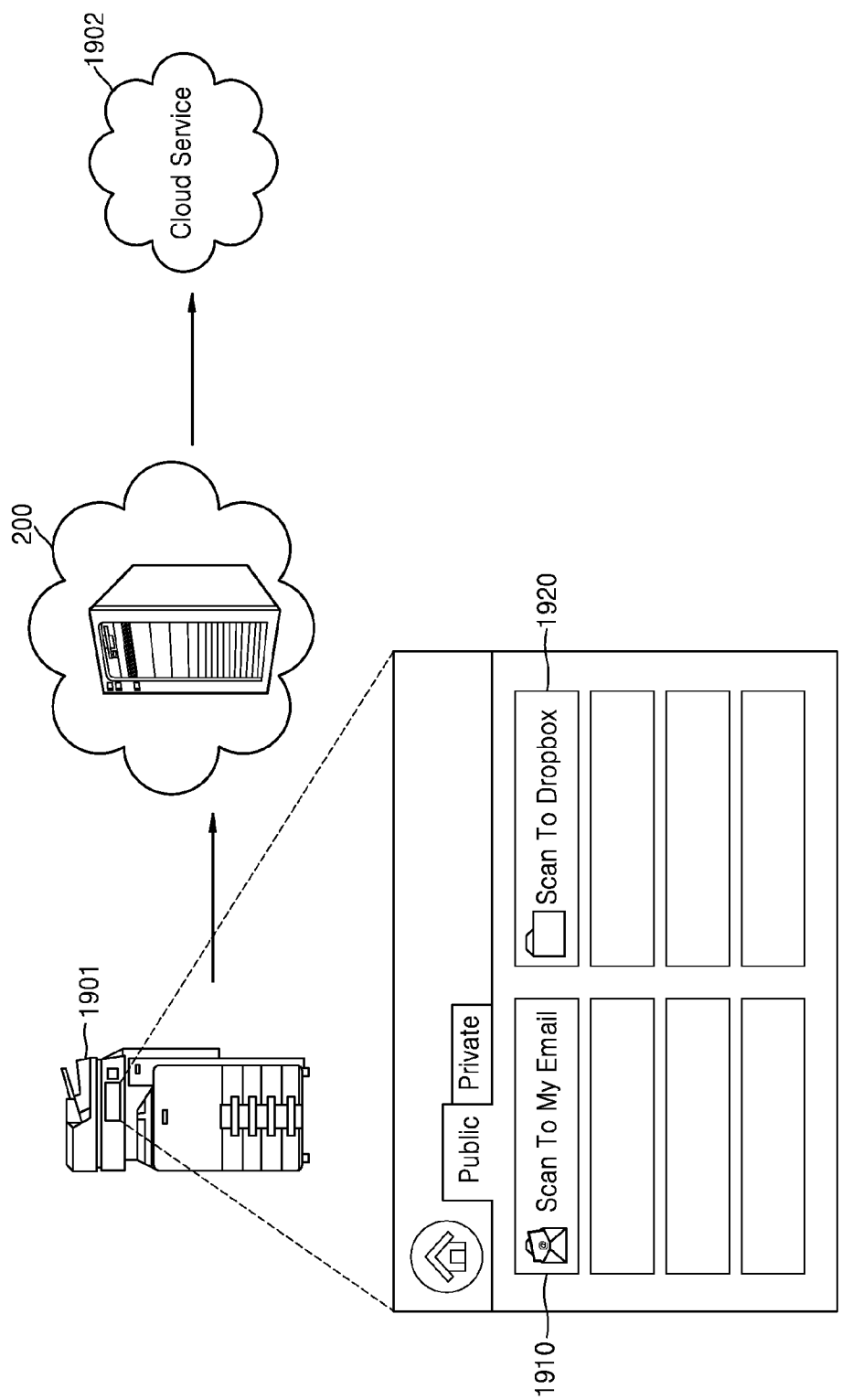
FIG. 19 is a diagram of a modification embodiment of an automatic connection service provided by a cloud print server of FIGS. 18A and 18B.

FIG. 19 is a diagram of a modification embodiment of an automatic connection service provided by the cloud print server 200 of FIGS. 18A and 18B.

The cloud print server 200 may control to directly receive an action performing request for a workflow from a user and perform an action. For example, if the user selects an item "scan to dropbox" 1920 on a user interface screen of an image forming apparatus 1901, the cloud print server 200 may receive an image file scanned by the image forming apparatus 1901 and may store the image file in a user account of a Dropbox cloud server that is an external cloud server 1920. However, the external cloud server performing an action is not limited thereto and may include external cloud servers providing various services.

In more detail, the second server 220 of the cloud print server 200 may stand by until the action performing request for the workflow is received. In this case, the cloud print server 200 may not periodically refer to device state information, may not determine whether a trigger condition is satisfied, and may perform an action corresponding to a workflow selected by the user.

The user may transmit the action performing request to the cloud print server 200 on the user interface screen of the image forming apparatus 1901. In more detail, the image forming apparatus 1901 may receive information of one or more workflows found in accordance with user identification information among workflows stored in the second server 220 via the first server 210 and may provide a list of selectable workflows to the user via the user interface screen by using the received information of the one or more workflows. The image forming apparatus 1901 may transmit an action performing request for one workflow selected by the user from among the provided list of workflows to the second server 220 via the first server 210.

The second server 220 may control to perform the action immediately without determining the trigger condition is satisfied if the action performing request for the selected workflow is received. That is, the second server 220 may transmit the received image file to the Dropbox cloud server that is the external cloud server 1920 with reference to destination information of the selected workflow such that the image file may be stored in the user account of the Dropbox cloud server that is the external cloud server 1920.

Figure 20:
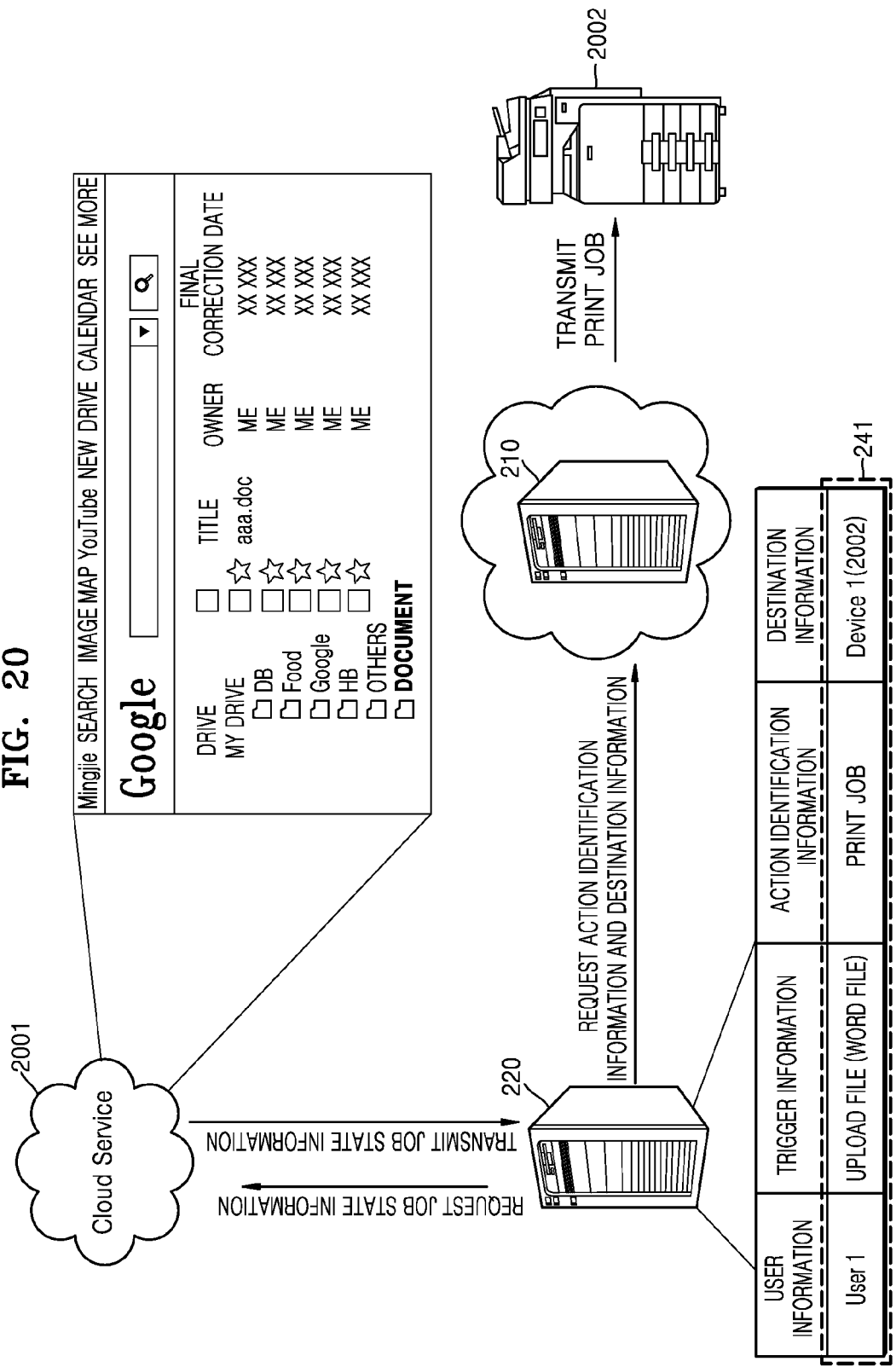
FIGS. 20 and 21 are diagrams for describing an automatic connection service provided by a cloud print server, according to another exemplary embodiment.
Figure 21:
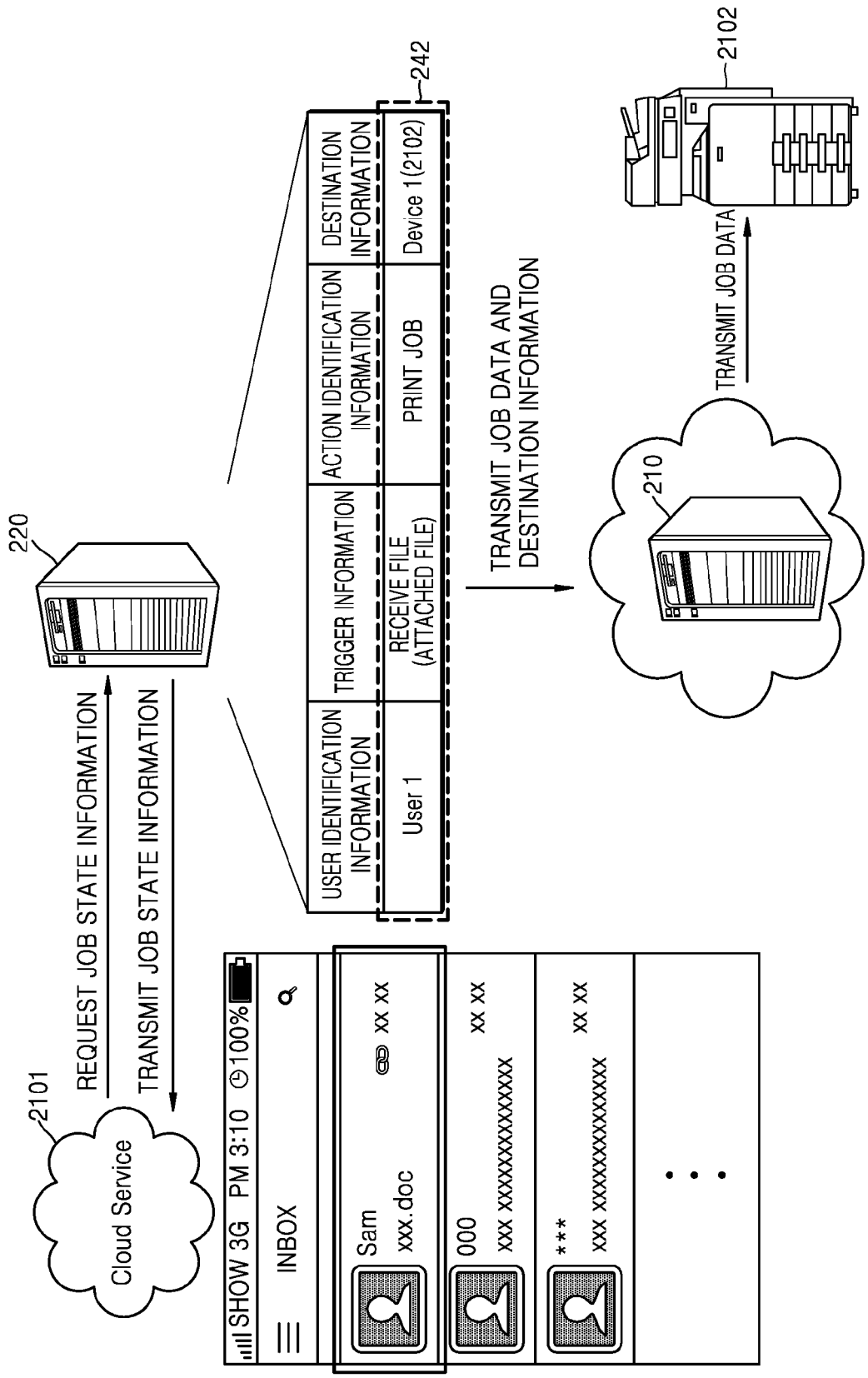

FIGS. 20 and 21 are diagrams for describing an automatic connection service provided by the cloud print server 200, according to another exemplary embodiment.

FIGS. 20 and 21 illustrate a process of, in a case where job state information is changed in an external cloud server, providing the automatic connection service by using the changed job state information.

Referring to FIG. 20, in a case where a new file is uploaded on a user account of a Google Drive cloud server 2001 that is an external cloud server, the cloud print server 200 may print the uploaded new file via an image forming apparatus 2002.

However, the external cloud server is not limited to the Google Drive cloud server 2001, may include various external cloud servers providing a storage service, and may also include external cloud servers providing other various services.

In more detail, the second server 220 may periodically transmit a request for the job state information to the Google Drive cloud server 2001 that is the external cloud server, and, in a case where the job state information is changed, receive the changed job state information from the Google Drive cloud server 2001.

For example, the second server 220 may receive the job state information "upload file" from the Google Drive cloud server 2001. The job state information may further include detailed information such as a file name of the uploaded file, a file type, a file size, an upload date, etc. and user identification information.

Referring to FIG. 20, the second server 220 may store a preset workflow 241.

The second server 220 may determine whether the received job state information "upload file" satisfies a trigger condition with reference to the found workflow 241 in accordance with the user identification information. Since the file type of the uploaded file is a word file, the second server 220 may determine that the received job state information "upload file" satisfies the trigger condition of the workflow 241. The second server 220 may control to perform an action "print job" corresponding to the trigger condition.

The second server 220 may transmit action identification information and destination information of the workflow 241 and an action performing request to the first server 210 in order to perform the action corresponding to the trigger condition of the workflow 241. The second server 220 may request the uploaded file from the Google Drive cloud server 2001 to receive the uploaded file, and may transmit the received uploaded file to the first server 210.

The first server 210 that receive the action identification information, the destination information, and the action performing request may transmit a print request and the uploaded file that is a print job target to the image forming apparatus 2002 to print the uploaded file based on the received action identification information the destination information.

Referring to FIG. 21, in a case where a new email to which a file is attached is received in a user account of a Gmail cloud server 2101 that is the external cloud server, the cloud print server 200 may print the file attached to the new email via the image forming apparatus 2102.

However, the external cloud server is not limited to the Gmail cloud server 2101, may include various external cloud servers providing an email service, and may also include external cloud servers providing other various services.

In more detail, the second server 220 may periodically transmit a request for job state information to the Gmail cloud server 2101 that is the external cloud server, and, in a case where the job state information is changed, receive the changed job state information from the Gmail cloud server 2101.

For example, the second server 220 may receive the job state information "receive email" from the Gmail cloud server 2101. The job state information may further include detailed information such as a title of the received email, a recipient, a receiving date, content, whether a file is attached or not, etc. and user identification information.

Referring to FIG. 21, the second server 220 may store a preset workflow 242.

The second server 220 may determine whether the received job state information "receive email" satisfies a trigger condition with reference to the workflow 242. Since a file "xxx.doc" is attached to the received email, the second server 220 may determine that the received job state information "receive email" satisfies the trigger condition of the workflow 242. The second server 220 may control to perform the action "print job" corresponding to the trigger condition.

The second server 220 may transmit action identification information and destination information of the workflow 242 and an action performing request to the first server 210 in order to perform the action corresponding to the trigger condition of the workflow 242. The second server 220 may request the received attached file from the Gmail cloud server 2101 to receive the attached file, and may transmit the received attached file to the first server 210.

The first server 210 may transmit a print request and the attached file "xxx.doc" that is a print job target to the image forming apparatus 2102 to print the attached file based on the received action identification information, destination information, and the attached file.

Figure 22:
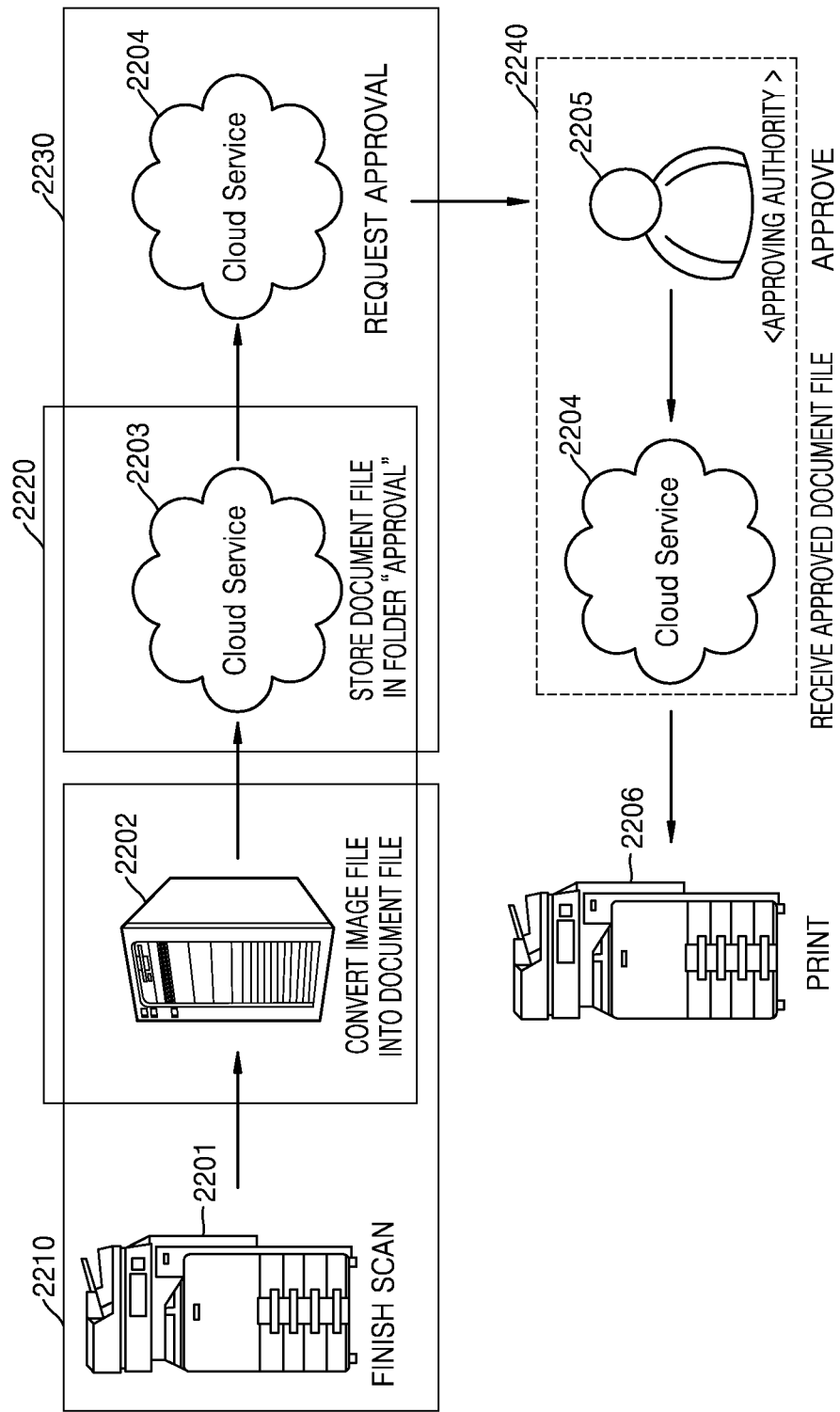
FIG. 22 is a diagram for describing a process in which a cloud print server continuously provides an automatic connection service, according to an exemplary embodiment.

FIG. 22 is a diagram for describing a process in which the cloud print server 200 continuously provides an automatic connection service, according to an exemplary embodiment.

The cloud print server 200 may provide a continuous automatic connection service including a plurality of actions.

For example, FIG. 22 illustrates the process in which the cloud print server 200 provides the continuous automatic connection service by using workflows 2210, 2220, 2230, ad 2240.

The user user1 may use the continuous automatic connection service to perform the plurality of actions requiring a document approval. Firstly, the user user1 may request a scan request for a document that is an approval target from an image forming apparatus 2201.

The cloud print server 200 may recognize an image of a scan file generated if the image forming apparatus 2201 finishes scanning as characters with reference to the workflow 2210 to convert the scan file into a document file. For example, the cloud print server 200 may allow a server 2202 in which an optical character reader (OCR) is installed to recognize the image of the scan file as characters.

In more detail, if the image forming apparatus 2201 finishes scanning, the cloud print server 200 may receive state information of a scan job to determine whether a trigger condition of the workflow 2210 is satisfied. If it is determined that the trigger condition of the workflow 2210 is satisfied, the cloud print server 200 may perform an action of the workflow 2210. That is, the cloud print server 200 may transmit the scan file to the server 2202 to convert the scan file into the document file.

If the converted document file is generated, the cloud print server 200 may transmit the converted document file to an account of the user user1 of a cloud server 2203 providing a storage space with reference to the workflow 2220. For example, in a case where a title of the stored document file includes "approval", the cloud print server 200 may transmit the document file to a folder "approval" of the cloud server 2203.

In more detail, if the converted document file is generated, the cloud print server 200 may receive job state information of the converted document file to determine whether a trigger condition of the workflow 2220 is satisfied. In a case where the title of the stored document file includes "approval", the cloud print server 200 may determine that the trigger condition of the workflow 2220 is satisfied and may perform an action of the workflow 220. That is, the cloud print server 200 may transmit the generated document file to the cloud server 2203, and the cloud server 2203 may store the received document file in the folder "approval".

If the document file is stored in the folder "approval" of the account of the user user1 of the cloud server 2203, the cloud print server 200 may transmit the document file to a cloud server 2204 providing an approval service with reference to the workflow 2230.

In more detail, the cloud print server 200 may receive job state information from the cloud server 2203 to determine whether a trigger condition of the workflow 2230 is satisfied. If a new document file is received in the folder "approval" of the cloud server 2203, the cloud print server 200 may determine that a trigger condition of the workflow 2230 is satisfied and may perform an action of the workflow 2230. That is, the cloud print server 200 may transmit the document file stored in the folder "approval" of the cloud server 2203 to an account of an approving authority 2205 of the cloud server 2204 to request approval of the document file from the approving authority 2205.

If the approving authority 2205 receives an approval request, the approving authority 2205 may approve the document file by using the approving service provided by the cloud server 2204. If the approving authority 2205 approves the document file, the cloud print server 200 may transmit the approved document file to an account of the user user1 of the cloud server 2204.

If the approved document file is received in the account of the user user1 of the cloud server 2204, the cloud print server 200 may generate a print job to print the received document file with reference to the workflow 2240.

In more detail, if the approved document file is received in the account of the user user1 of the cloud server 2204, the cloud print server 200 may determine that a trigger condition of the workflow 2240 is satisfied and may perform an action of the workflow 2240. That is, the cloud print server 200 may generate the print job of printing the received document file and may transmit the print job to an image forming apparatus 2206 to print the received document file.

The user user1 may preset the workflows 2210, 2220, 2230, and 2240 so that the automatic connection service that continuously performs an action of converting the scanned file into the document file when the document requiring the approval is scanned, an action of storing the converted document file in the cloud server 2203, an action of transmitting the approval request for the document file, and, in a case where the approval is finished, an action of printing the approved document file may be provided to the user user1.

Figure 23A:
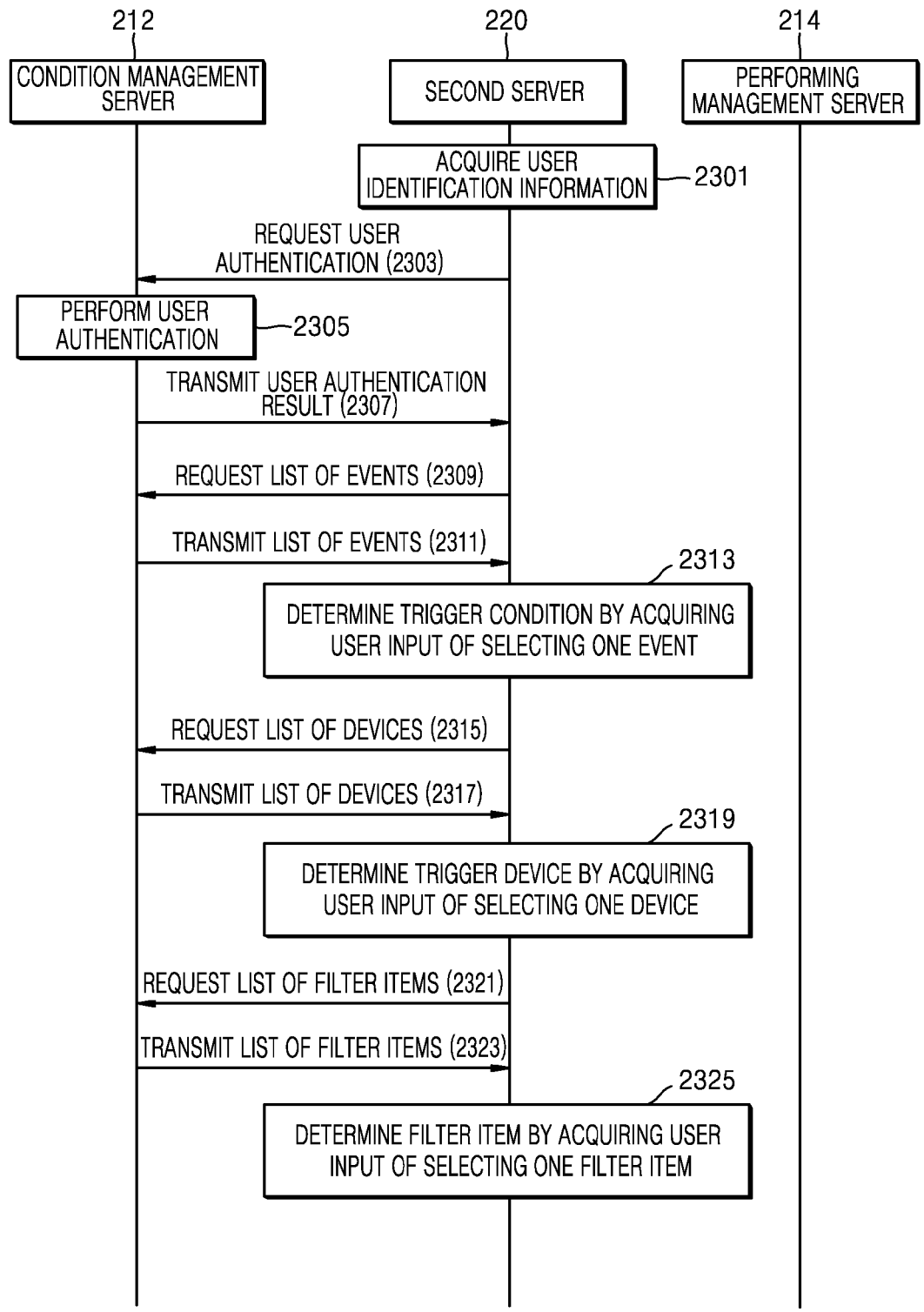
FIGS. 23A and 23B are flowcharts of processes of generating workflows for providing an automatic connection service, according to an exemplary embodiment.
Figure 23B:
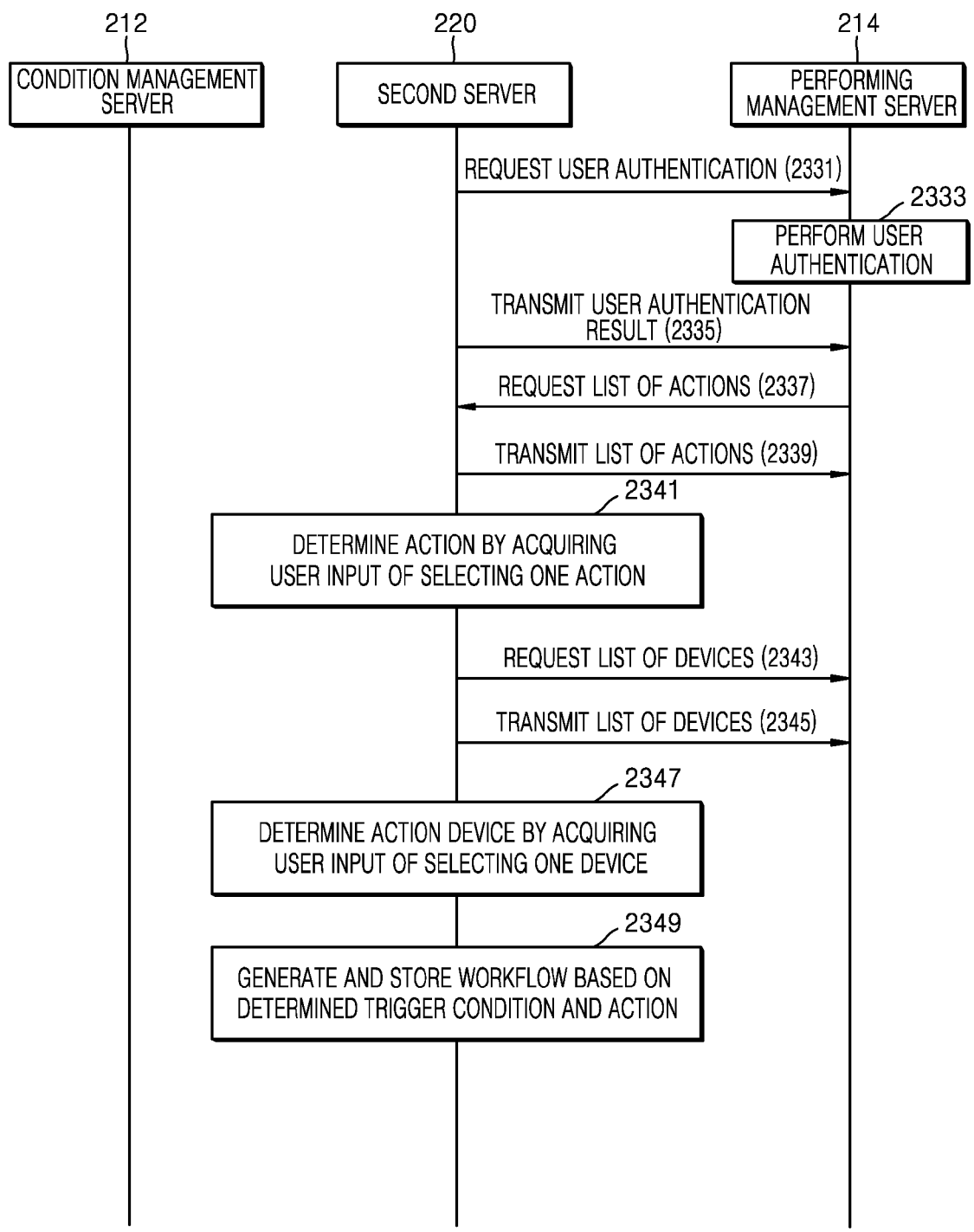

FIGS. 23A and 23B are flowcharts of processes of generating workflows for providing an automatic connection service, according to an exemplary embodiment.

FIG. 23a illustrates the process of setting a trigger condition of the workflow with reference to a condition management server 212. FIG. 23B illustrates the process of setting an action of the workflow with reference to a performing management server 214. The condition management server 212 and the performing management server 214 are illustrated as separate servers in FIGS. 23A and 23B but are not limited thereto. The condition management server 212 and the performing management server 214 may be implemented as the one first server 210 managing an image forming apparatus and job state information and storing information regarding the image forming apparatus.

Referring to FIG. 23a, to set the rigger condition of the workflow, a user may select an event determined as the trigger condition, a trigger target device, and a filter item.

The user who sets the workflow may access the second server 220 via a user device such as a PC, a laptop computer, a mobile terminal, etc. That is, the user may receive information from the second server 220 and transmit a user input to the second server 220 via a user interface of the mobile terminal.

In operation S2301, the second server 220 may acquire user identification information. The user identification information may be intrinsic information used to identify the user, and may include, for example, a phone number, a registration ID used in a system, an email address, etc. The second server 220 may receive the user identification information from the user via the user device.

In operation S2303, the second server 220 may request a user authentication from the condition management server 212 by using the user identification information. The second server 220 may transmit the received user identification information to the condition management server 212 and may request the user authentication from the condition management server 212.

In operation S2305, the condition management server 212 may perform authentication by using the received user authentication information. The condition management server 212 may store information regarding a registration user including the user identification information in a user information database. The condition management server 212 may use the received user authentication information to determine whether the user of the user authentication information is a valid user.

In operation S2307, the condition management server 212 may transmit a user authentication performing result to the second server 220. The condition management server 212 may transmit a valid authentication result to the second server 220 in a case where the user of the user authentication information is the valid user. In a case where the valid authentication result is received, the second server 220 may provide authorization for generating the workflow to the user who inputs the user authentication information.

In operation S2309, the second server 220 may request a list of events that are to be set as the trigger condition from the condition management server 212.

In operation S2311, the condition management server 212 that receives a request for the list of events may transmit the list of events to the second serer 220. For example, the condition management server 212 may store the list of events that are set as the trigger condition in accordance with the user authentication information or device authentication information and, if the request is received, may transmit the list of events to the second serer 220.

In operation S2313, the second server 220 may acquire a user input to set the trigger condition. The second server 220 may provide the list of events to the user and may acquire a user input of selecting one event from the list of events from the user. The second server 220 may determine the trigger condition by using the acquired user input.

In operation S2315, the second server 220 may request a list of devices that are to be set as target devices of the trigger condition from the condition management server 212.

In operation S2317, the condition management server 212 that receives a request for the list of devices may transmit the list of devices to the second server 220. For example, the condition management server 212 may store a list of registration devices available by the user in accordance with the user authentication information, if the request is received, may transmit the list of devices to the second serer 220.

In operation S2319, the second server 220 may acquire a user input to set the target devices of the trigger condition. The second server 220 may provide the list of devices to the user and may acquire a user input of selecting one device from the list of devices from the user. The second server 220 may determine the device by using the acquired user input.

In operation S2321, the second server 220 may request a list of specific filer items with respect to the trigger condition from the condition management server 212.

In operation S2323, the condition management server 212 that receives a request for the list of filer items may transmit the list of filer items to the second server 220. For example, the condition management server 212 may store a list of filer items selectable by the user in accordance with the user authentication information or the trigger condition and, if the request is received, may transmit the list of filer items to the second serer 220.

In operation S2325, the second server 220 may acquire a user input to set the specific filer items with respect to the trigger condition. The second server 220 may provide the list of filer items to the user and may acquire a user input of selecting one filer item from the list of filer items from the user. The second server 220 may determine the filer item by using the acquired user input.

The operations of setting the trigger condition, determining the trigger target condition, and determining the filter item may be performed by the second server 220 in parallel, and the above order is merely an example and the exemplary embodiment is not limited thereto.

FIG. 23B shows the process of setting the action of the workflow. To set the action of the workflow, the user may select the action that is to be performed in accordance with the trigger condition and an action target device.

In operation S2331, the second server 220 may request a user authentication from the performing management server 214 by using user identification information. The second server 220 may transmit the received user identification information to the performing management server 214 and may request the user authentication from the performing management server 214.

In operation S2333, the performing management server 214 may perform authentication by using the received user authentication information. The performing management server 214 may store information regarding a registration user including the user identification information in a user information database. The performing management server 214 may use the received user authentication information to determine whether the user of the user authentication information is a valid user.

In operation S2335, the performing management server 214 may transmit a user authentication performing result to the second server 220. The performing management server 214 may transmit a valid authentication result to the second server 220 in a case where the user of the user authentication information is the valid user.

In operation S2337, the second server 220 may request a list of actions for selecting the action that is to be performed in accordance with the trigger condition from the performing management server 214.

In operation S2339, the performing management server 214 that receives a request for the list of actions may transmit the list of actions to the second serer 220. For example, the performing management server 214 may store the list of actions that are set as actions in accordance with the trigger condition or the user authentication information and, if the request is received, may transmit the list of actions to the second serer 220.

In operation S2341, the second server 220 may acquire a user input to set the action. The second server 220 may provide the list of actions to the user and may acquire a user input of selecting one action from the list of actions from the user. The second server 220 may determine the action by using the acquired user input.

In operation S2343, the second server 220 may request a list of devices that are to be set as target devices of the trigger condition from the performing management server 214.

In operation S2345, the performing management server 214 that receives a request for the list of devices may transmit the list of devices to the second server 220. For example, the performing management server 214 may store a list of registration devices available by the user in accordance with the user authentication information and, if the request is received, may transmit the list of devices to the second serer 220.

In operation S2347, the second server 220 may acquire a user input to set the target device of the trigger condition. The second server 220 may provide the list of devices to the user and may acquire a user input of selecting one device from the list of devices from the user. The second server 220 may determine the device by using the acquired user input.

In operation S2349, the second serve r220 may generate and store the workflow based on the set trigger condition and action.

The operations of setting the trigger condition of FIG. 23A and setting the action of FIG. 23B may be performed by the second server 220 in parallel, and the order is merely an example and the exemplary embodiment is not limited thereto.

FIG. 24 is a flowchart of a process in which the cloud print server 200 of FIG. 1A provides an automatic connection service, according to an exemplary embodiment.

As described with reference to FIGS. 23A and 23B, the condition management server 212 and the performing management server 214 are illustrated as separate servers in FIG. 24 but are not limited thereto. The condition management server 212 and the performing management server 214 may be implemented as the one first server 210 managing an image forming apparatus and job state information and storing information regarding the image forming apparatus.

In operation S2400, the condition management server 212 may acquire at least one piece of state information among state information of a device of the image forming apparatus and state information of a job performed by the image forming apparatus. For example, the condition management server 212 may store a plurality of pieces of state information and state information of the device and the job in a database in a storage unit, may receive the state information from the image forming apparatus, and may update the plurality of pieces of state information stored in the database according to the state information received from the image forming apparatus.

In operations S2405 and S2410, the second server 220 may receive at least one piece of the state information among the state information of the device of the image forming apparatus and the state information of the job from the condition management server 212. In more detail, the second server 220 may periodically transmit a request for the state information from the condition management server 212 to receive the device state information or the job state information.

In operation S2415, the second server 220 may determine whether the received state information satisfies a preset trigger condition.

The second server 220 may store a workflow in order to provide the automatic connection service and may determine whether the preset trigger condition is satisfied with reference to the workflow. The trigger condition of the workflow may include a filter item indicating detailed conditions determining whether the trigger condition is satisfied. The second server 220 may determine whether the preset trigger condition is satisfied in a case where the received state information satisfies the filter item.

In operation S2420, in a case where content is necessary for performing an action in accordance with the trigger condition, the second server 220 may transmit a request for the content to the condition management server 212.

In operation S2425, if the request for the content with respect to the action is received from the second server 220, the condition management server 212 may transmit the content to the second server 220.

In operation S2430, the second server 220 may transmit a performing request for the action in accordance with the trigger condition to the performing management server 214. The second server 220 may transmit identification information of the action that is to be performed in accordance with the trigger condition and destination information to the performing management server 214.

The workflow stored in the second server 220 may include the identification information of the action that is to be performed in accordance with the trigger condition. The workflow may include the destination information indicating identification information of a target device on which the action is to be performed in accordance with the trigger condition or information of a location in which the action is performed. In more detail, the destination information may include a mobile terminal and an image forming apparatus that are to perform a job transmitted from the second server 220, or another cloud server that is to receive the job, etc, as a destination.

The second server 220 may transmit the content received from the condition management server 212 to the performing management server 214.

In operation S2435, the performing management server 214 may confirm validity with respect to the destination.

The performing management server 214 may receive the action identification information and the destination information from the second server 220 to confirm validity with respect to the destination in which the action is to be performed. For example, in a case where the destination information indicates the image forming apparatus that is to perform the job, the performing management server 214 may confirm whether the image forming apparatus indicated by the destination information is a registration device with reference to a device information database.

In operation S2440, the performing management server 214 may perform the action in accordance with the trigger condition by using the action identification information and the destination information. If validity with respect to the destination is confirmed, the performing management server 214 may allow the device indicated by the destination information to perform the action indicated by the action identification information in the location indicated by the destination information.

FIG. 25 is a flowchart of a process in which the cloud print server 200 of FIG. 10 provides an automatic connection service, according to an exemplary embodiment.

The first server 210 and the second server 220 of FIG. 25 may operate in the same manner as the condition management server 212 and the second server 220 of FIG. 24, respectively, and thus descriptions of the same operations are omitted.

In operation S2530, the second server 220 of FIG. 25 may directly transmit an action performing request to the external cloud server 130 in order to control the external cloud server 130 to perform an action. The second server 220 may transmit action identification information and destination information to the external cloud server 130. The external cloud server 130 may receive the action identification information and the destination information to perform the action.

FIG. 26 is a flowchart of a process in which the cloud print server 200 of FIG. 1D provides an automatic connection service, according to an exemplary embodiment.

The first server 210 and the second server 220 of FIG. 26 may operate in the same manner as the condition management server 212 and the second server 220 of FIG. 24, respectively, and thus descriptions of the same operations are omitted.

The second server 220 of FIG. 26 may directly receive state information of an image forming job from the external cloud server 105. For example, the second server 220 may periodically monitor the external cloud server 105 to receive the state information of the image forming job corresponding to user identification information.

If a trigger condition is satisfied, the second server 220 may request and receive content with respect to an action in accordance with the trigger condition form the external cloud server 220. Alternatively, the second server 220 may receive only information regarding content such as an address of the content to transmit the information to the first server 210.

FIG. 27 is a block diagram of a configuration of the cloud print server 200, according to an exemplary embodiment.

The cloud print server 200 according to an exemplary embodiment may include the first server 210 and the second server 220.

The first server 210 may include a communication unit 211, a storage unit 212, and a control unit 213.

The communication unit 211 may allow the first server 210 to communicate with the second server 220 or an external apparatus of the cloud print server 200 such as an image forming apparatus.

The storage unit 212 may store various pieces of information for providing an automatic connection service.

The communication unit 211 may acquire at least one piece of state information among device state information of the image forming apparatus and state information of a job performed by the image forming apparatus. For example, the communication unit 211 may receive at least one piece of state information among the device state information of the image forming apparatus and the state information of the job performed by the image forming apparatus from the image forming apparatus and store the received state information in the storage unit 212.

The communication unit 211 may transmit the at least one piece of state information among the device state information of the image forming apparatus and the state information of the job performed by the image forming apparatus to the second server 220. For example, if a request for the state information is received from the second server 220, the communication unit 211 may transmit updated state information to the second server 220.

In a case where a workflow is generated, the communication unit 211 may receive user identification information from the second server 220 and may transmit a user authentication result. The storage unit 212 may store information regarding a registration user including the user identification information in a user information database. The control unit 213 may perform user authentication with reference to the storage unit 212.

The communication unit 211 may transmit information regarding registration devices available by a user and an event list and a filter item list that may be set as a trigger condition to the second server 220. The storage unit 212 may store a list of the registration devices available by the user corresponding to the user identification information in the user information database and may store the event list and the filter item list that may be set as the trigger condition in accordance with the registration devices.

The control unit 213 may be a CPU generally controlling operations of the elements included in the first server 210.

In a case where destination information is received from the second server 220, the control unit 213 may confirm validity with respect to a destination by using the received destination information.

In a case where the validity with respect to the destination is confirmed, the control unit 213 may receive action identification information, the destination information, and an action performing request from the second server 220 and perform an action in accordance with the trigger condition.

The second server 220 may include a communication unit 221, a storage unit 222, and a control unit 223.

The communication unit 221 may allow the second server 220 to communicate with the first server 210 or an external apparatus of the cloud print server 200.

The communication unit 221 may receive at least one piece of state information among device state information and job state information from the first server 210. In a case where the received state information satisfies a trigger condition, the communication unit 221 may transmit action identification information, destination information, and an action performing request to the first server 210.

In a case where a workflow is generated, the communication unit 221 may acquire a user input from a user via a user device in order to provide an automatic connection service. The communication unit 221 may transmit the information received from the first server 210 to the user device to provide the information to the user.

The storage unit 222 may store the workflow including a preset condition and a preset action in order to provide the automatic connection service.

The control unit 223 may be a CPU generally controlling operations of the elements included in the second server 220.

The control unit 223 may determine whether the trigger condition is satisfied with reference to the workflow stored in the storage unit 222.

The exemplary embodiments described above can be written as computer programs and can be implemented in general-use digital computers that execute the programs using a computer-readable recording medium. Examples of the computer-readable recording medium include storage media such as magnetic storage media (e.g., ROM, floppy disks, hard disks, etc.) and optical recording media (e.g., CD-ROMs, or DVDs).

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of providing, by a first server and a second server implemented by computing hardware, automatic connection services for an image forming apparatus among image forming apparatuses, the method comprising:
by the first server,
storing, in at least one memory,
a first mapping of the state information of the image forming apparatus and/or a job for the image forming apparatus, with identification information of the image forming apparatus; and by the second server,
- storing, in at least one memory,
  - a second mapping to indicate correspondences of,
    - identification information of a user,
    - a condition of the image forming apparatus,
    - an operation to be performed in response to a trigger of the condition, and
    - destination information to indicate a destination for the operation to be performed; and
- acquiring, from the first mapping, state information of the image forming apparatus and/or the job for the image forming apparatus;
- determining whether the acquired state information satisfies a previously stored condition for the image forming apparatus for the user in the second mapping by searching the second mapping for the state information corresponding to the identification information of the image forming apparatus that satisfies the previously stored condition for the image forming apparatus; and
- in response to the determining that the acquired state information satisfies the previously stored condition for the image forming apparatus for the user, triggering an automatic connection service, among the automatic connection services, of the user to the destination to cause performing a previously stored operation corresponding to the satisfied previously stored condition in the second mapping by,
  - transmitting, by the second server to the first server, operation identification indicating the previously stored operation and the destination information, and
  - performing, by the first server, the previously stored operation corresponding to the satisfied previously stored condition, based on the operation identification and the destination information received from the second server.

2. The method of claim 1, wherein:
the acquiring of the state information is by the first server to:
- map, in the first mapping, the state information of the image forming apparatus and the identification information of the image forming apparatus, and the determining is by the second server to:
- search, the second mapping, for the state information corresponding to the identification information of the image forming apparatus that satisfies the previously stored condition for the image forming apparatus.

3. The method of claim 1, wherein:
the acquiring of the state information is by the first server to:
- map, in the first mapping, the state information of the job and the identification information of the user requesting the job, and the determining by the second server to:
- search, the second mapping, for the state information of the job corresponding to the identification information of the user that satisfies the previously stored condition for the image forming apparatus.

4. The method of claim 1, further comprising:
acquiring, by the second server, capability information of the image forming apparatus; and determining, by the second server, an image forming option to perform the previously stored operation by using the acquired capability information of the image forming apparatus.

5. The method of claim 1, wherein:
the triggering of the automatic connection service to cause performing of the previously stored operation corresponding to the satisfied previously stored condition further comprises:
- transmitting, by the second server, to an external server external to the second server, operation identification indicating the previously stored operation and the destination information.

6. The method of claim 3, wherein:
the acquiring of the state information is performed by the first server and/or the second server;
the determining, by the second server, further comprises:
- determining whether content is necessary for performing the previously stored operation corresponding to the satisfied previously stored condition;
- in response to the determining that the content is necessary, receiving, by the second server, at least information of the content with respect to the previously stored operation; and
- transmitting the at least information of the content to the first server to cause the performing of the previously stored operation.

7. The method of claim 2, further comprising:
acquiring, by the second server, the identification information of the user corresponding to the image forming apparatus and/or the job for the image forming apparatus; and the determining, by the second server, determines the destination information based on the acquired identification information of the user.

8. The method of claim 7, wherein the determining of the destination information comprises transmitting, by the second server, a request for the destination information to the first server and receiving the destination information from the first server.

9. A server system for providing automatic connection services for an image forming apparatus among image forming apparatuses, the server system comprising:
at least one server implemented by computing hardware that executes instructions to cause the at least one server to implement,
a first server to
- store, in at least one memory, a first mapping of the state information of the image forming apparatus and/or a job for the image forming apparatus, with identification information of the image forming apparatus, and
- acquire state information of the image forming apparatus and/or the job for the image forming apparatus; and a second server to:
- store, in at least one memory, a second mapping to indicate correspondences of,
  - identification information of a user,
  - a condition of the image forming apparatus,
  - an operation to be performed in response to a trigger of the condition, and
  - destination information to indicate a destination for the operation to be performed; and
- determine whether the acquired state information satisfies a previously stored condition for the image forming apparatus for the user in the second mapping by searching the second mapping for the state information corresponding to the identification information of the image forming apparatus that satisfies the previously stored condition for the image forming apparatus; and in response to the determining that the acquired state information satisfies the previously stored condition for the image forming apparatus for the user, triggering an automatic connection service, among the automatic connection services, of the user to the destination to cause performance of a previously stored operation corresponding to the satisfied previously stored condition in the second mapping by, transmitting, by the second server to the first server, operation identification indicating the previously stored operation and the destination information, and performing, by the first server, the previously stored operation corresponding to the satisfied previously stored condition, based on the operation identification and the destination information received from the second server.

10. The server system of claim 9,
wherein the first server maps, in the first mapping, the state information of the image forming apparatus and the identification information of the image forming apparatus, and
wherein the second server searches the second mapping, for the state information corresponding to the identification information of the image forming apparatus that satisfies the previously stored condition for the image forming apparatus.

11. The server system of claim 9,
wherein the first server maps, in the first mapping, the state information of the job and the identification information of a user requesting the job, and
wherein the second server searches the second mapping for the state information of the job corresponding to the identification information of the user that satisfies the previously stored condition for the image forming apparatus.

12. The server system of claim 9, wherein the second server acquires capability information of the image forming apparatus and determines an image forming option for performing the previously stored operation by using the acquired capability information of the image forming apparatus.

13. The server system of claim 9, wherein the second server transmits to an external server external to the second server, operation identification indicating the previously stored operation and the destination information.

14. The server system of claim 9, wherein:
the first server and/or the second server acquire the state information;
the second server,
determines whether content is necessary for performing the previously stored operation corresponding to the satisfied previously stored condition,
in response to the determination that the content is necessary, receives at least information of the content with respect to the previously stored operation, and
transmits the at least information of the content to the first server to cause the performing of the previously stored operation.

15. The server system of claim 9, wherein:
the second server
acquires the identification information of the user corresponding to the image forming apparatus and/or the job for the image forming apparatus, and
determines the destination information based on the acquired identification information of the user.

16. The server system of claim 15, wherein the second server is transmits a request for the destination information to the first server and receives the destination information from the first server.

17. A non-transitory computer-readable recording medium having recorded thereon a computer program to cause a first server and a second server implemented by computing hardware to provide automatic connection services for an image forming apparatus among image forming apparatuses by:

storing, in at least one memory,
a first mapping of the state information of the image forming apparatus and/or a job for the image forming apparatus, with identification information of the image forming apparatus; and
a second mapping to indicate correspondences of,
identification information of a user,
a condition of the image forming apparatus,
an operation to be performed in response to a trigger of the condition, and
destination information to indicate a destination for the operation to be performed; and
acquiring, from the first mapping, state information of the image forming apparatus and/or the job for the image forming apparatus;
acquiring state information of the image forming apparatus and/or a job for the image forming apparatus;
determining whether the acquired state information satisfies a previously stored condition for the image forming apparatus for the user in the second mapping by searching the second mapping for the state information corresponding to the identification information of the image forming apparatus that satisfies the previously stored condition for the image forming apparatus; and
in response to the determining that the acquired state information satisfies the previously stored condition for the image forming apparatus for the user, triggering an automatic connection service, among the automatic connection services, of the user to the destination to cause performing a previously stored operation corresponding to the satisfied previously stored condition in the second mapping by,
transmitting, by the second server to the first server, operation identification indicating the previously stored operation and the destination information, and
performing, by the first server, the previously stored operation corresponding to the satisfied previously stored condition, based on the operation identification and the destination information received from the second server.

18. The method of claim 1, wherein the conditions of the image forming apparatus include event information of the image forming apparatus while the image forming apparatus operates and/or job event information for the image forming apparatus, the destination information for the user indicates a plurality of destination apparatuses for respective operations to be performed,
at least one of the plurality of automatic connection services of the user including notifying the acquired state information to a destination apparatus, among the destination apparatuses, in the second mapping.

* * * * *

UNITED STATES PATENT AND TRADEMARK OFFICE
CERTIFICATE OF CORRECTION

PATENT NO. : 9,720,636 B2
APPLICATION NO. : 15/012955
DATED : August 1, 2017
INVENTOR(S) : Min-hyun Kim et al.

Page 1 of 1

It is certified that error appears in the above-identified patent and that said Letters Patent is hereby corrected as shown below:

In the Claims

Column 38, Line 12:
In Claim 16, after "server" delete "is".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*